(12) United States Patent
Ferlitsch

(10) Patent No.: US 7,821,657 B2
(45) Date of Patent: *Oct. 26, 2010

(54) CONTINUOUS RASTER IMAGE PROCESSING CONTROL ACROSS PRINT JOBS

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1126 days.

This patent is subject to a terminal disclaimer.

(21) Appl. No.: 10/941,142

(22) Filed: Sep. 14, 2004

(65) Prior Publication Data

US 2006/0055952 A1 Mar. 16, 2006

(51) Int. Cl.
*G06F 3/12* (2006.01)
*H04N 1/40* (2006.01)
*G06K 15/00* (2006.01)

(52) U.S. Cl. .............. 358/1.13; 358/2.1; 358/1.14; 358/1.15; 358/1.16; 358/1.18

(58) Field of Classification Search .......... 358/1.13, 358/1.9, 2.1, 1.16, 3.17, 1.18, 1.15, 1.14; 345/961, 533; 399/2
See application file for complete search history.

(56) References Cited

U.S. PATENT DOCUMENTS

| | | | |
|---|---|---|---|
| 5,239,625 A * | 8/1993 | Bogart et al. ............. 345/428 |
| 5,337,258 A | 8/1994 | Dennis | |
| 5,446,837 A | 8/1995 | Motoyama et al. | |
| 5,467,432 A | 11/1995 | Ota | |
| 5,511,149 A | 4/1996 | Hayano | |
| 5,528,374 A * | 6/1996 | Matias ................. 358/296 |
| 5,566,278 A | 10/1996 | Patel et al. | |
| 5,579,087 A | 11/1996 | Salgado .................. 355/202 |
| 5,600,762 A | 2/1997 | Salgado .................. 395/114 |
| 5,652,711 A * | 7/1997 | Vennekens ............. 358/1.17 |
| 5,697,040 A | 12/1997 | Rabjohns et al. | |
| 5,706,410 A | 1/1998 | Bagley et al. | |
| 5,754,748 A | 5/1998 | Rivers et al. | |
| 5,767,978 A | 6/1998 | Revankar et al. | |
| 5,793,937 A * | 8/1998 | Chura et al. ............ 358/1.16 |
| 5,796,411 A * | 8/1998 | Cyman et al. ........... 345/502 |
| 5,859,711 A * | 1/1999 | Barry et al. ............. 358/296 |
| 5,873,659 A | 2/1999 | Edwards et al. | |
| 5,923,013 A * | 7/1999 | Suzuki et al. ........... 235/375 |
| 5,940,581 A | 8/1999 | Lipton | |
| 5,960,113 A | 9/1999 | Even et al. | |
| 5,960,166 A | 9/1999 | Brown, III et al. | |
| 5,966,503 A | 10/1999 | Van Vliembergen ...... 395/106 |
| 5,978,560 A | 11/1999 | Tan et al. | |
| 5,978,563 A * | 11/1999 | Kawamoto et al. ....... 358/1.17 |

(Continued)

FOREIGN PATENT DOCUMENTS

EP 1 006 431 A1 6/2000

(Continued)

*Primary Examiner*—Twyler L Haskins
*Assistant Examiner*—Jonathan R Beckley
(74) *Attorney, Agent, or Firm*—Stolowitz Ford Cowger LLP

(57) ABSTRACT

A job joining capability is used in a Multifunction Peripheral Device (MFP) to conduct continuous Raster Image Processing (RIP) across multiple job boundaries. Print jobs which do not have inter-RIP conflicts are printed back-to-back as a continuous single RIP. This is particularly advantageous for single copy, single page, and other small print jobs.

19 Claims, 22 Drawing Sheets

U.S. PATENT DOCUMENTS

| | | | |
|---|---|---|---|
| 6,027,268 A | | 2/2000 | Bischel et al. |
| 6,046,748 A * | | 4/2000 | Horowitz et al. ............. 345/596 |
| 6,049,390 A * | | 4/2000 | Notredame et al. ........ 358/1.15 |
| 6,052,198 A * | | 4/2000 | Neuhard et al. ............ 358/1.15 |
| 6,097,498 A * | | 8/2000 | Debry et al. ................ 358/1.13 |
| 6,185,632 B1 * | | 2/2001 | Berkema ..................... 710/20 |
| 6,219,151 B1 | | 4/2001 | Manglapus et al. |
| 6,246,487 B1 | | 6/2001 | Kobayashi |
| 6,272,501 B1 * | | 8/2001 | Baumann ................. 707/104.1 |
| 6,295,133 B1 * | | 9/2001 | Bloomquist et al. .......... 358/1.1 |
| 6,327,050 B1 * | | 12/2001 | Motamed et al. ........... 358/1.18 |
| 6,331,896 B1 * | | 12/2001 | Morita ....................... 358/1.18 |
| 6,348,971 B2 | | 2/2002 | Owa et al. |
| 6,359,698 B1 | | 3/2002 | Kawaguchi |
| 6,400,467 B1 * | | 6/2002 | Harrington .................. 358/1.9 |
| 6,453,129 B1 | | 9/2002 | Simpson et al. |
| 6,459,498 B2 | | 10/2002 | Miyake et al. |
| 6,490,055 B1 | | 12/2002 | Shimizu |
| 6,498,656 B1 | | 12/2002 | Mastie et al. |
| 6,549,947 B1 | | 4/2003 | Suzuki |
| 6,604,805 B2 | | 8/2003 | Nguyen et al. ................. 347/14 |
| 6,633,396 B1 * | | 10/2003 | Barry et al. ................. 358/1.14 |
| 6,738,153 B1 * | | 5/2004 | Aschenbrenner et al. ... 358/1.14 |
| 6,774,913 B1 * | | 8/2004 | Varga et al. ................. 345/629 |
| 6,809,833 B1 * | | 10/2004 | Blair et al. .................. 358/1.16 |
| 6,819,439 B2 | | 11/2004 | Hayashi et al. |
| 6,825,943 B1 * | | 11/2004 | Barry et al. ................. 358/1.15 |
| 6,850,335 B1 * | | 2/2005 | Barry et al. ................. 358/1.15 |
| 6,879,409 B2 * | | 4/2005 | Motamed et al. ........... 358/1.13 |
| 6,930,795 B1 * | | 8/2005 | Motamed et al. ........... 358/1.18 |
| 6,934,046 B1 * | | 8/2005 | Nishikawa et al. .......... 358/1.15 |
| 6,934,047 B2 * | | 8/2005 | Housel ....................... 358/1.15 |
| 7,016,061 B1 * | | 3/2006 | Hewitt ....................... 358/1.15 |
| 7,072,052 B1 * | | 7/2006 | Tanahashi et al. ............. 358/1.1 |
| 7,099,027 B1 * | | 8/2006 | Barry et al. ................. 358/1.15 |
| 7,202,964 B2 * | | 4/2007 | Christiansen .............. 358/1.15 |
| 7,236,268 B2 * | | 6/2007 | Rao et al. .................... 358/2.1 |
| 7,242,487 B2 * | | 7/2007 | Lucivero et al. ........... 358/1.13 |
| 7,251,052 B2 | | 7/2007 | Ferlitsch |
| 7,262,879 B2 | | 8/2007 | Chang et al. |
| 7,268,910 B2 * | | 9/2007 | Catt et al. ................... 358/1.18 |
| 7,298,503 B2 * | | 11/2007 | Christiansen et al. ...... 358/1.13 |
| 7,352,481 B2 * | | 4/2008 | Christiansen .............. 358/1.13 |
| 7,411,692 B2 | | 8/2008 | Ferlitsch |
| 7,551,299 B2 * | | 6/2009 | Ferlitsch .................... 358/1.13 |
| 2001/0047369 A1 * | | 11/2001 | Aizikowitz et al. ......... 707/500 |
| 2002/0001104 A1 | | 1/2002 | Shima |
| 2002/0044301 A1 | | 4/2002 | Kitazawa |
| 2002/0051241 A1 | | 5/2002 | Ogino ....................... 358/474 |
| 2002/0057449 A1 | | 5/2002 | Chapman et al. |
| 2002/0060801 A1 | | 5/2002 | Motamed et al. |
| 2002/0080389 A1 | | 6/2002 | Carney |
| 2002/0089687 A1 | | 7/2002 | Ferlitsch et al. |
| 2002/0089688 A1 | | 7/2002 | Ferlitsch et al. |
| 2002/0089691 A1 | | 7/2002 | Ferlitsch et al. |
| 2002/0089692 A1 | | 7/2002 | Fertlitsch |
| 2002/0097418 A1 | | 7/2002 | Chang et al. |
| 2002/0102119 A1 * | | 8/2002 | Christodoulou et al. ....... 400/62 |
| 2002/0144162 A1 | | 10/2002 | Tada et al. |
| 2002/0163664 A1 * | | 11/2002 | Sugano ..................... 358/1.15 |
| 2003/0011805 A1 | | 1/2003 | Yacoub |
| 2003/0033353 A1 | | 2/2003 | Simpson et al. |
| 2003/0046454 A1 | | 3/2003 | Hoffmann et al. |
| 2003/0053112 A1 | | 3/2003 | Motosugi et al. |
| 2003/0086114 A1 | | 5/2003 | Cherry et al. |
| 2003/0123084 A1 | | 7/2003 | Brossman et al. |
| 2003/0184782 A1 | | 10/2003 | Perkins et al. |
| 2003/0184799 A1 | | 10/2003 | Ferlitsch et al. |
| 2003/0184807 A1 * | | 10/2003 | Tsuchitoi ................... 358/1.18 |
| 2003/0189725 A1 * | | 10/2003 | Kloosterman et al. ...... 358/1.18 |
| 2003/0191790 A1 | | 10/2003 | Horiyama |
| 2003/0231328 A1 | | 12/2003 | Chapin et al. |
| 2004/0190014 A1 | | 9/2004 | Ferlitsch |
| 2004/0196470 A1 * | | 10/2004 | Christiansen ............... 358/1.1 |
| 2004/0196496 A1 * | | 10/2004 | Klassen .................... 358/1.15 |
| 2004/0218202 A1 | | 11/2004 | Josephsen et al. |
| 2004/0252401 A1 | | 12/2004 | Foster et al. |
| 2005/0007632 A1 | | 1/2005 | Miyazaki et al. |
| 2005/0015779 A1 | | 1/2005 | Christiansen |
| 2005/0036173 A1 | | 2/2005 | Hayashi et al. |
| 2005/0052700 A1 | | 3/2005 | Mackenzie et al. |
| 2005/0088697 A1 | | 4/2005 | Yasutomi et al. |
| 2005/0146742 A1 | | 7/2005 | Gregory et al. |
| 2005/0162667 A1 * | | 7/2005 | Felix et al. ................... 358/1.1 |
| 2005/0225789 A1 | | 10/2005 | Ferlitsch |
| 2006/0033958 A1 * | | 2/2006 | d'Entrecasteaux ......... 358/1.16 |

FOREIGN PATENT DOCUMENTS

| | | |
|---|---|---|
| EP | 0 704 791 B1 | 4/2001 |
| EP | 1 133 154 A2 | 9/2001 |
| EP | 0 917 042 B1 | 7/2004 |
| GB | 2 380 453 A | 4/2003 |
| WO | WO 99/38068 | 7/1999 |
| WO | WO 01/31432 A1 | 5/2001 |

* cited by examiner

CONTINUOUS RASTER IMAGE PROCESSING CONTROL ACROSS PRINT JOBS

BACKGROUND

Modern Multifunction Peripheral (MFP) devices have the ability to process multiple page and/or multiple copies at high speeds. More specifically, these devices are able to print the second page and/or second copy at or near the rated print engine speed.

These machines still have a problem obtaining optimum engine performance when printing a continuous stream of single copy-single page jobs, or any print job with a low-number of pages. Few printing devices are effective in job streaming or continuous Raster Image Processing (RIP) for low-page count print jobs.

FIG. 1A shows the traditional operation of an MFP device 12. The MFP device 12 handles the processing of a print job 13 using a channel selector 14, input pipe 20, sniffer 18, and one or more print data interpreters 22, 24 and 26. The print data interpreters can include a PJL interpreter 22, a Page Description Language (PDL) or Printer Control Language (PCL) interpreter 24, or a PDL or Post Script (PS) interpreter 26.

The channel selector 14 arbitrates the selection of the print jobs 13. The print jobs may be transmitted via a serial input device and multiple print jobs may be pending on multiple different input channels. For example, print jobs may be received over a parallel, serial and/or USB port, LPR port from a host 1 and a LPR port from a host 2, etc. Print jobs may also be received over wireless ports, such as IrDA, Bluetooth and Wi-Fi.

The channel selector 14 reads the data from the selected channel and buffers the data into an input buffer 16, which may be Random Access Memory (RAM). In some cases, the input buffer 16 is sufficient to hold the entire print job 13. In other situations, the print data must be buffered in chunks in input buffer 16 as previously stored chunks of print data in buffer 16 are processed by the MFP 12.

When a new print job is detected by the channel selector 14, and the first block(s) of print data are buffered in input buffer 16, the channel selector 14 initiates the sniffer 18 to pre-read (i.e., non-consumed) the first buffered data block. The sniffer 18 analyzes the first bytes in the buffered print data from the new print job to determine the print language type such as, PJL, PCL, Portable Document Format (PDF), Postscript, etc. The sniffer 18 invokes the print language interpreter 22, 24 or 26 associated with the identified print language and informs the input pipe 20 which interpreter 22, 24, or 26 to direct the data blocks for the new print job. This process is generally referred to as auto-language switching.

In FIG. 1B, print jobs are typically generated by a printer driver, that converts document/image data into printer ready data. One class of printers 12, sometimes referred to as ASCII printers, support industry common print data languages such as PJL, PCL, Postscript, and PDF. Print jobs generated for these devices from their associated printer drivers are typically constructed with the following sequence:

1. UEL—Universal Exit Language.
2. Printer Job Language (PJL) sequence to indicate the spooling of a print job (i.e., single RIP).
3. PJL sequence for job-wide settings.
4. PJL sequence for explicit language switch to a page description language (PDL).
5. PDL data for the page-settings and page data.
6. UEL—Universal Exit Language.
7. PJL sequence to indicate the end of the spooling of a print job.

When the UEL sequence is encountered, the printing device 12 configures itself to start the processing of a new RIP. Following the UEL, the sniffer 18 (FIG. 1A) detects the presence of PJL commands and informs the input pipe 20 to direct the remaining input data to PJL interpreter 22. The PJL interpreter 22 interprets the PJL command sequences, which generally result in configuring job-wide settings for the current print job context, such as setting environmental parameters for an options manager 28. The PJL sequence typically ends with an explicit language switch (i.e., @PJL ENTER LANGUAGE=<PDL>). This instruction informs the input pipe 20 that the print data type for the remaining print data has changed to PDL. The PJL interpreter 22 then terminates processing. The PJL sequence may also not end with an explicit language switch, but merely be followed by commands in a PDL format. In this case, when the PJL interpreter encounters a non-PJL formatted statement, the subsequent print stream is passed back to the sniffer 18 to initiate an automatic language switch for the remaining print data.

Referring to FIG. 1C, upon receipt of the explicit language switch from the PJL interpreter 22 or automatic language switch from the sniffer 18, the input pipe 20 invokes the associated PDL interpreter 24 (e.g., PCL) and redirects the remaining input data to the corresponding PDL interpreter 24. The PDL interpreter 24 processes the PDL data to construct page images. Print job processing may be controlled by one or more job-wide settings 30 set in the options manager 28 by the PJL interpreter 22 (FIG. 2B), and further controlled by subsequent job-wide settings and page-specific settings specified in the PDL data.

The PDL interpreter 24 may produce page images as follows:

1. Syntactical analysis of the PDL data.
2. Semantic analysis of the PDL data.
3. Convert the PDL data into an unrendered intermediate representation, referred to as a Display List (DL) 32.

The print system described above does not initially fully process the print data. Instead, the print system processes the print data just enough to verify that the data is valid (syntactic and semantic) and converts the data into a format efficient for subsequent rendering.

In FIG. 1D, the PDL interpreter 24 completes consuming all of the remaining print data for example when an End Of File (EOF) condition is detected indicating the end of the job's spool data. The PDL interpreter 24 sends back an acknowledgement message 34 to the channel selector 14 indicating that the print job was successfully processed such as by being converted to the display list 32. Depending on the type of printing protocol handling, the channel selector 14 may then send back a successful job completion acknowledgement message to the host device, release the connection on the channel, and proceed to arbitrate the next print job on one of the available input channels.

In FIG. 1E, the PDL interpreter 24 typically encounters at least one UEL 21 before the end of the input data for the print jobs formed by an associated printer driver. The UEL 21 notifies the PDL interpreter 24 of a RIP segment boundary. The subsequent print data following the UEL 21, if any, may be processed by a different PDL interpreter(s). Note, the print data from a single print job may contain more than one RIP segments. If the UEL 21 is at the end of the input data (i.e., EOF), the PDL interpreter 24 sends a message to the rendering process 25 that the last DL element has been generated for this RIP segment, and returns control back to the input pipe 20 and sniffer 18.

In FIG. 1F, the rendering process 25 includes a RIP operation 40 that converts the DL data 32 into RIP images, which are then placed on a RIP queue 42. The rendering process 25 generally is asynchronous and may begin processing as the DL elements 32 are being generated. Some operations of the rendering task 25 may be further controlled by job-wide settings (e.g., copies, collation, post-collation finishing, document filing) specified by the print job options manager 28. The RIP images are then sent from the RIP queue 42 to the print engine 44.

When the above channel selection, interpreter and rendering processes switch from processing one RIP segment to another RIP segment, a substantial time delay may occur. The time delay occurs even when the RIP segments are in the same spool file or the same print job. These delays may be a combination of software (e.g., reallocation of buffers, font unloading/reloading etc.) and hardware processes (e.g., engine cycle down, media/output path roller shutdown/startup changes, etc.).

These inter-RIP delays are undesirable when the printing device receives a continuous stream of back-to-back jobs. This delay is particularly undesirable for small page count jobs when none of the job differences such as job-wide settings and PDL interpreter would result in inter-RIP conflicts. An inter-RIP conflict refers to a subsequent RIP segment that cannot be processed in the same context of the previous RIP segment.

Therefore, there is a desire for a more effective method for printing back-to-back print jobs that do not have inter-RIP conflicts as a continuous RIP.

SUMMARY OF THE INVENTION

A job joining capability is used in a Multifunction Peripheral Device (MFP) to conduct continuous Raster Image Processing (RIP) across multiple job boundaries. Print jobs which do not have inter-RIP conflicts are printed back-to-back as a continuous single RIP. This is particularly advantageous for single copy (e.g., single page) and other small print jobs.

The foregoing and other objects, features and advantages of the invention will become more readily apparent from the following detailed description of a preferred embodiment of the invention which proceeds with reference to the accompanying drawings.

DETAILED DESCRIPTION

Figure 1A:
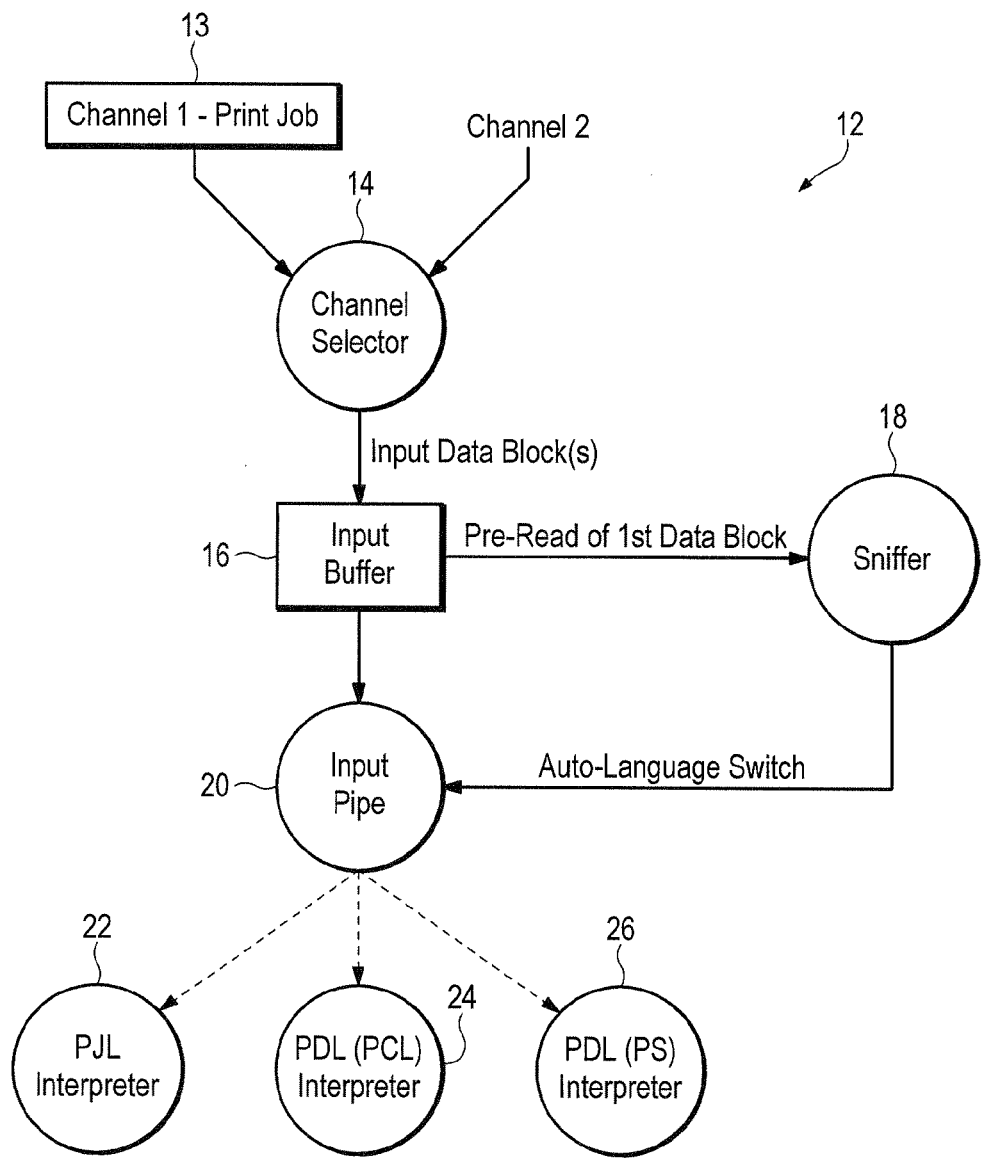
FIG. 1A shows channel selection and auto-language switching on initial receipt of a print job.
Figure 1B:
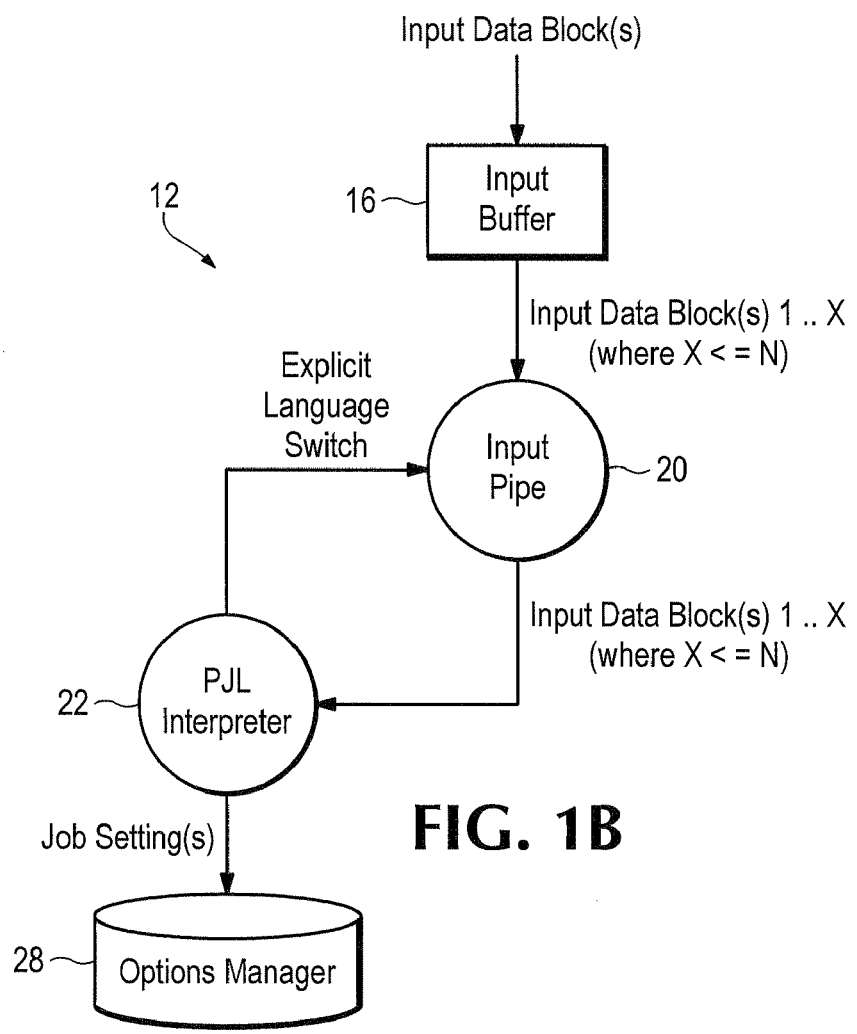
FIG. 1B shows a PJL header followed by an explicit language switch into a PDL interpreter.
Figure 1C:
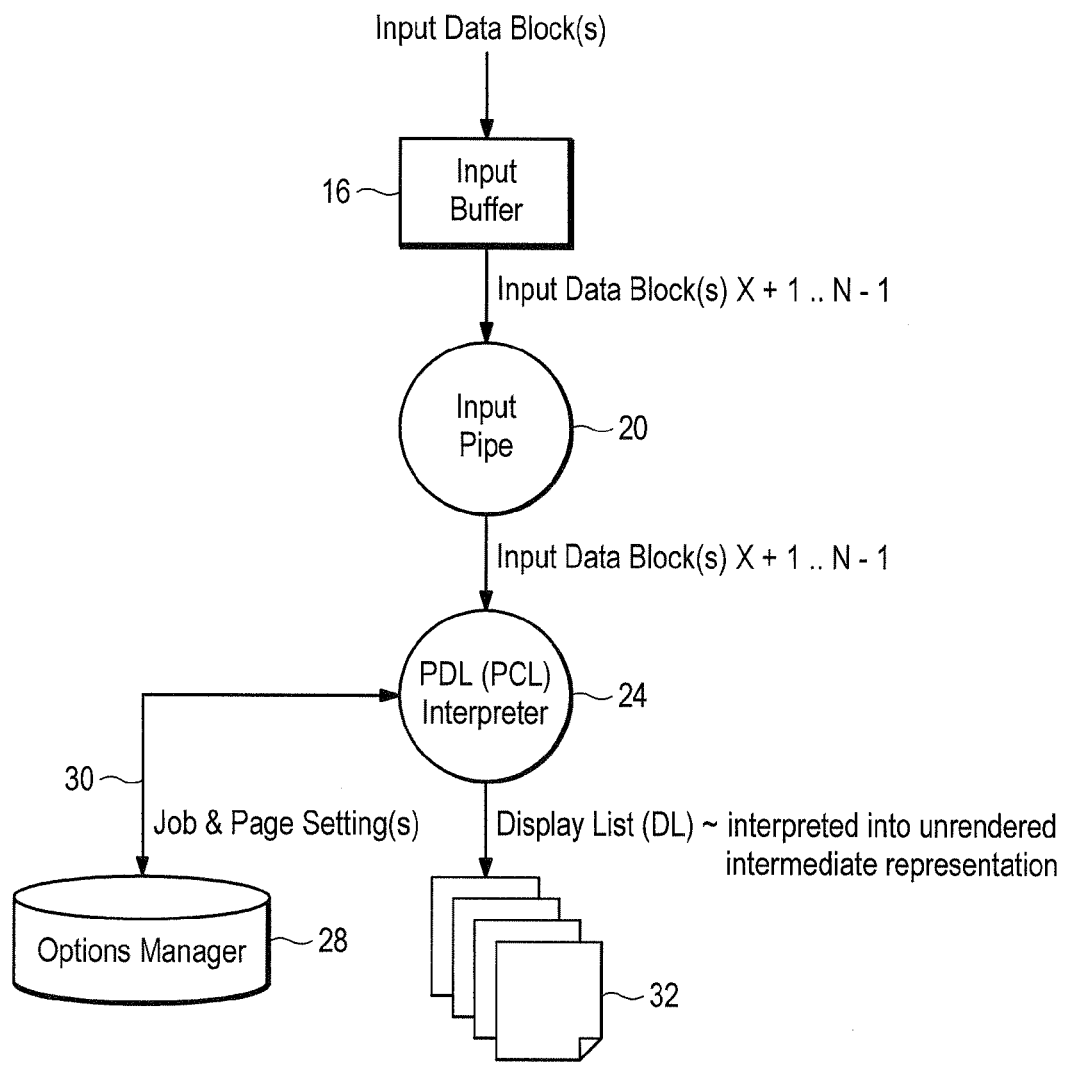
FIG. 1C shows processing of PDL data into Display List (DL) data after an explicit language switch.
Figure 1D:
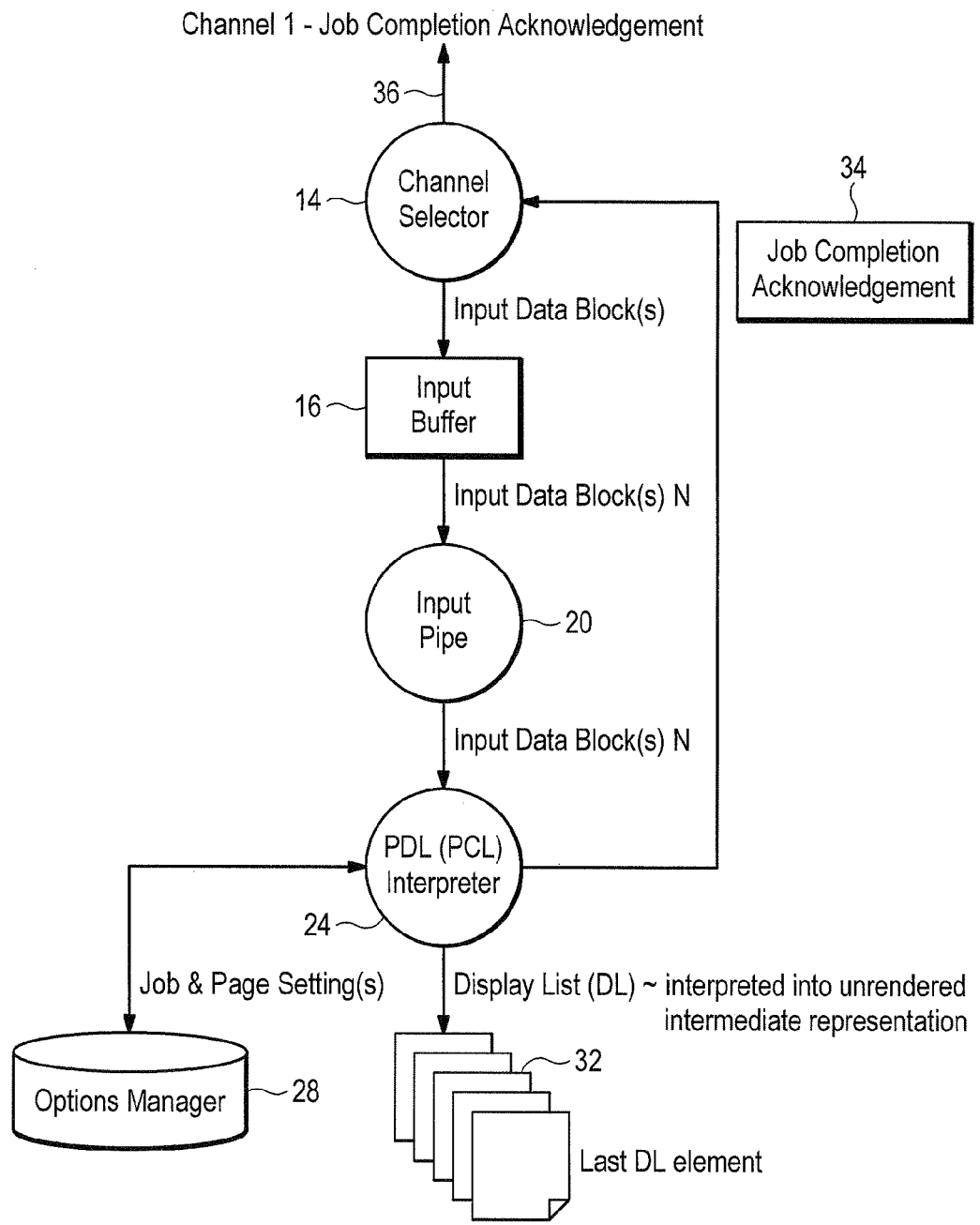
FIG. 1D shows sending a job completion acknowledgement back to a host after generating the last display list element.
Figure 1E:
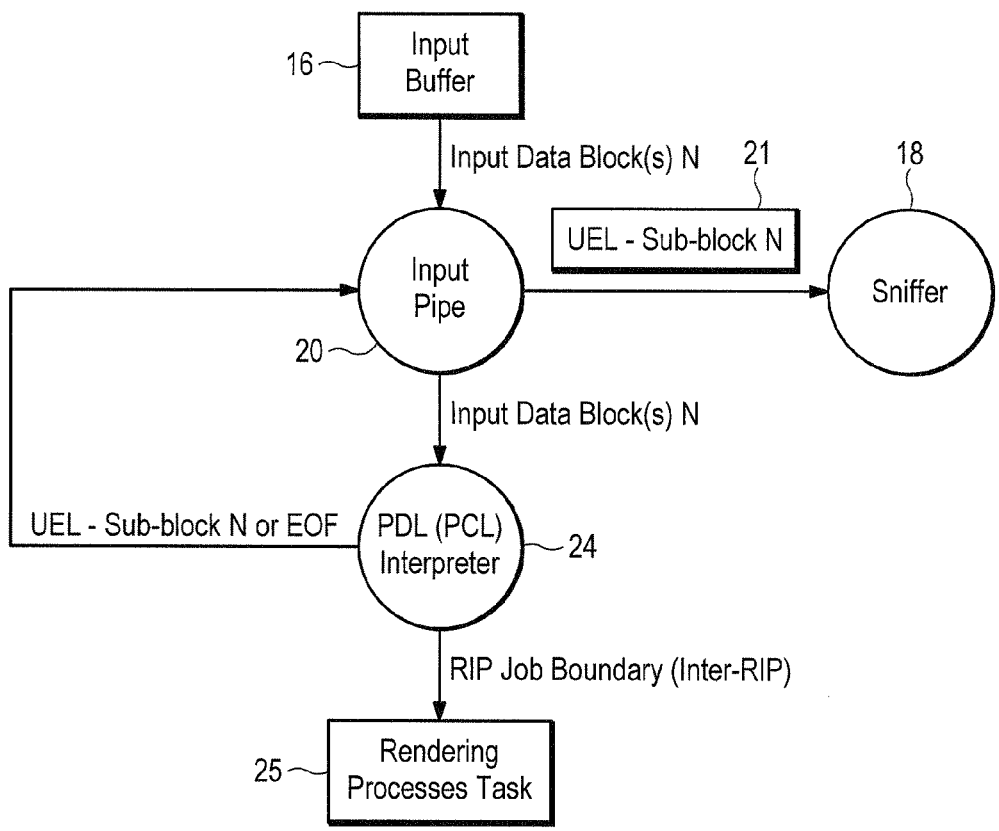
FIG. 1E shows an explicit RIP boundary (UEL) or implicit (EOF).
Figure 1F:
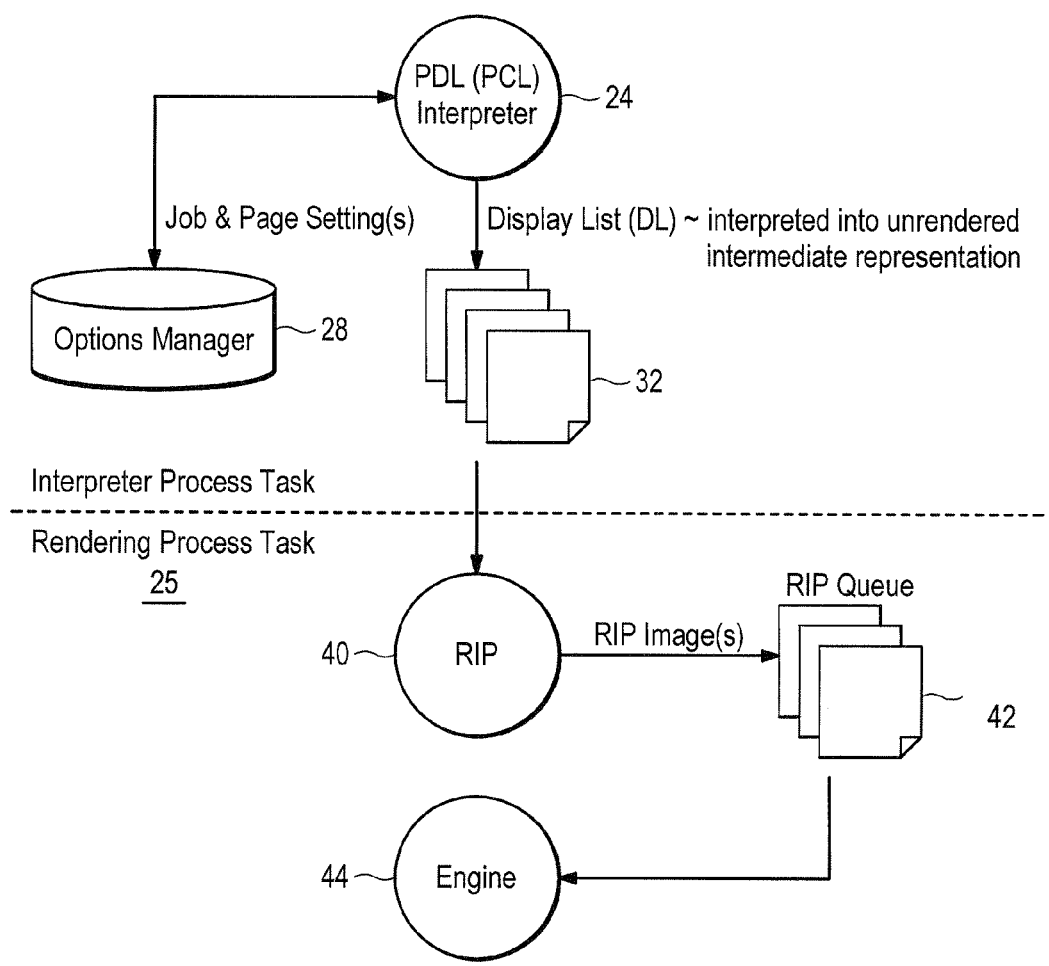
FIG. 1F shows asynchronous rasterization of a display list.
Figure 2A:
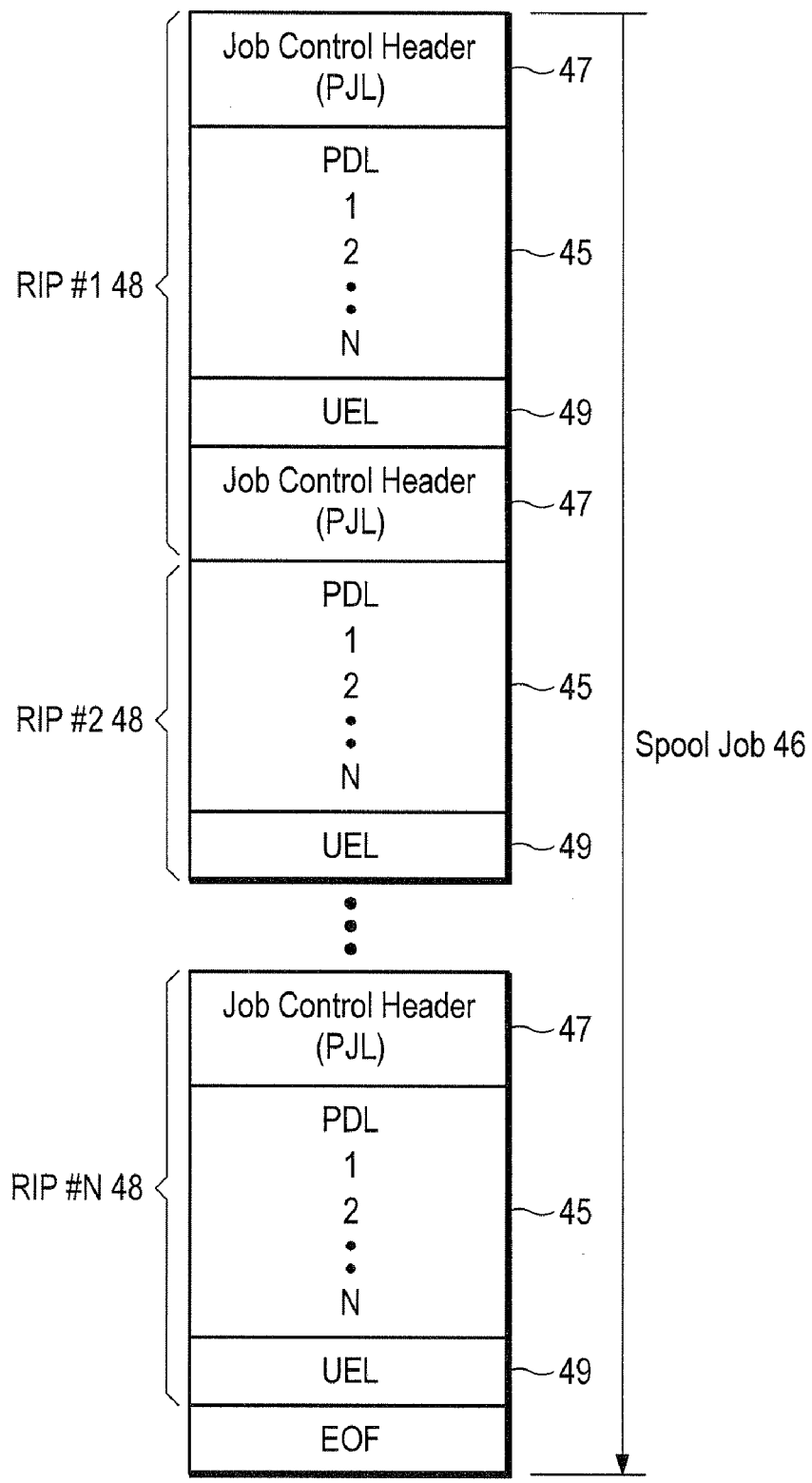
FIG. 2A shows multiple RIP segments processed as a continuous spool job.

Referring to FIG. 2A, a spool job 46 refers to a continuous unit of processing work for the printing device. Each spool job 46 may contain multiple print jobs 48 alternatively referred to as Raster Image Processing (RIPs) elements. Boundaries for different RIP segments 48 are separated by Universal Exit Language (UEL) 49 data and optional PJL in the job control header 47. The RIP segments 48 also may include PDL data 45. The spool job 46 and RIP segments 48 and additional spool jobs 46 are referred to generally below as print data, a print data stream or simply as input data.

The UELs 49 notify a printing device to reset for a possible new set of print job characteristics that may be associated with the next RIP element 48. However, resetting the printing device for each RIP element 48 is time consuming. For example, the reset operation can cause the printer rollers, heating elements, and other electromechanical printing elements and software related operations in the printing device to shut down, reset, and then turn back on again. One aspect of the invention causes RIP elements 48 with compatible print job characteristics to be processed as one continuous spool job 46 or RIP without having to repeatedly reset the printing device for each separate RIP segment 48.

Several different techniques are described below for conducting the continuous RIP operation.

Job Joining in PDL Interpreter

In one embodiment, job joining occurs in, or downstream of, the PDL interpreters. When the PDL interpreter encounters a RIP boundary (e.g., UEL), it saves the job context, or a subset specific to the RIP. The PDL interpreter also signals the rendering process task of the completion of display list (DL) generation. If the RIP boundary is an EOF (i.e., end of spool data), the PDL interpreter sends a message back to the input channel selector indicating a preference to receive the next job from the same channel.

The PDL interpreter, or controlling process, defers ending the job processing context until a message is received back from the input channel selector. If the input channel selector sends back an end continuous RIP message, the PDL interpreter, or controlling process, then ends the job processing context as normal (i.e., individual RIP). The input channel selector may indicate the end of a continuous RIP when a timeout occurs waiting on a new job, or when a job is selected from a different channel.

If the input channel selector sends back a message to continue the RIP, the current job context is maintained. The continue message may be sent by the channel selector for example when another print job is received on the same input channel within a specified time period. The PDL interpreter then completes without further processing of any RIP-ending commands (e.g., UEL and PJL EOJ).

The processing of the next print job starts as normal (i.e., sniffer process/auto-language switch) until a PJL or PDL interpreter is invoked. In the case of the PJL interpreter, the following may happen:
1. Interprets the PJL and stores the job settings in a temporary location.
2. Compares the temporary settings to the saved job context of the last RIP segment.
3. If any unresolved inter-RIP conflicts remain, the previous RIP ends, the temporary job settings are copied to the current job settings, and the current RIP segment is continued as an individual RIP.
4. Otherwise with no inter-RIP conflicts or with all inter-RIP conflicts resolved, the temporary, or resolved, job settings are copied to the current job settings and the current RIP segment is processed as a continuation of the previous RIP segment.
5. The explicit language switch (e.g., PCL) is performed when encountered.
6. The PDL from the explicit language switch does a pre-read of some initial portion of the PDL data up to the first page preamble (i.e., reads any job-wide settings), and backs up the input data stream.
7. The PDL job-wide context is compared with the current job settings.
8. If unresolved inter-RIP conflicts remain, the previous RIP ends, the temporary job settings are copied to the current job settings, and the current RIP segment continues as an individual RIP.
9. Otherwise if there are no inter-RIP conflicts or all inter-RIP conflicts resolved, the PDL data is re-read and the current RIP segment continues as a continuation of the previous RIP segment.
10. The display list (DL) elements for the current RIP segment are appended onto the end of the previous RIP segment.

Job Joining Fusion in Channel Selector

In another implementation, job joining is performed as follows:
1. When the PDL interpreter encounters a RIP boundary (e.g., UEL), it defers (suspends) processing the UEL and preserves the current job context, in addition to signaling the rendering process task of the completion of the display list (DL) generation. The PDL interpreter then waits for a message from the channel selector.
2. The continuous RIP decision making process occurs in the channel selector. The channel selector does a pre-read of the next input data block.
3. If a no job join message is received from the channel selector, the PDL interpreter resumes processing the UEL and completes the processing of the previous job as an individual RIP. The channel selector may send a non-job join message for example, when there is a timeout, inter-RIP conflict, or when a print job is received over a different input channel.
4. If the PDL interpreter receives a continue RIP message, the PDL interpreter discards the UEL and other subsequent ending RIP boundary commands for the current print job.
5. The input channel selector then discards the beginning RIP boundary commands (UEL, PJL) from the next print job received from the input data stream.

Job Joining Fusion and Control in Channel Selector

Another implementation operates as follows:
1. The channel selector pre-reads each data block and performs the continuous RIP decisions as described above.
2. If two RIP segments are going to be fused into one, the channel selector discards the ending RIP boundary commands from the first print job (in addition to discarding the beginning RIP boundary commands from the second print job) from the input data stream.
3. The PDL interpreter does not wait on a UEL for a message when a job is fused, since it never receives the UEL (and other ending/beginning RIP boundary commands), until the end of the continuous RIP.

Inter-RIP Continuous RIP Setup Between RIP Segments

Figure 2B:
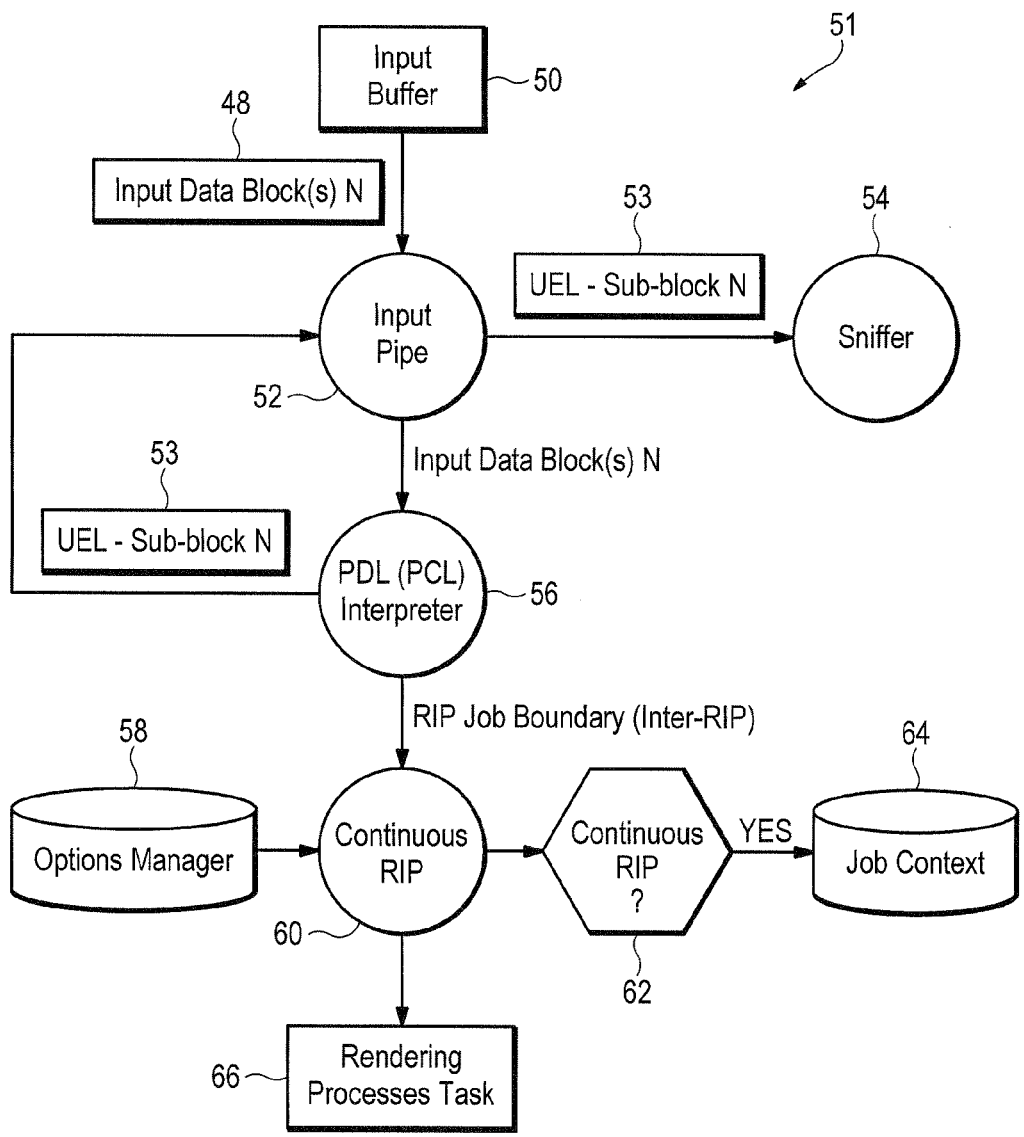
FIG. 2B shows inter-RIP continuous RIP setup between RIPs in the same spool file.

Referring to FIG. 2B, a printing device 51 includes an input pipe 52 that receives input print data blocks 48 from an input buffer 50. The print data 48, RIP segments, print jobs, etc. may come from one host or multiple different hosts over one or more input channels. The print data 48 may also come from internal channels in the printing device 51, such as from a facsimile unit which sends a copy of the fax job to the printer unit for rendering a hard-copy output.

A PDL interpreter 56 in printing device 51 processes the input data blocks 48 identifying an ending RIP boundary, such as UEL 53. The PDL interpreter 56 forwards the UEL end of block message back to the input pipe 52 which then forwards the UEL notification 53 to the sniffer 54. This starts the sniffer looking for control language in the next input data block 48 that may require an interpreter different from the PDL interpreter 56. For example, a PJL interpreter or a PDL (PS interpreter).

A continuous RIP operation 60 decides if the currently processed RIP element 48 (input data block N) is going to be considered for the continuous RIP operation. For example, an operator may manually select keys on the printing device 51 that enable the continuous RIP operation. This manual operator selection is received by the continuous RIP operation 60 via an options manager 58 that monitors operator selections on a printing device control panel. Alternatively, user control is contained within the print jobs 48 and may indicate to the continuous RIP operation 60 that a continuous RIP mode is enabled.

If the printing device 51 is in a continuous RIP mode, the job context or RIP related context of the current print data block 48 is copied to a temporary job context buffer 64 by operation 62. The processing of the current print job data block 48 then continues as normal, such as signaling the rendering process 66 to render display list (DL) elements into RIP images. Some operations of the rendering task 66 may be further controlled by job-wide settings (e.g., copies, collation, post-collation finishing, document filing) specified by the print job options manager 58.

Figure 3:
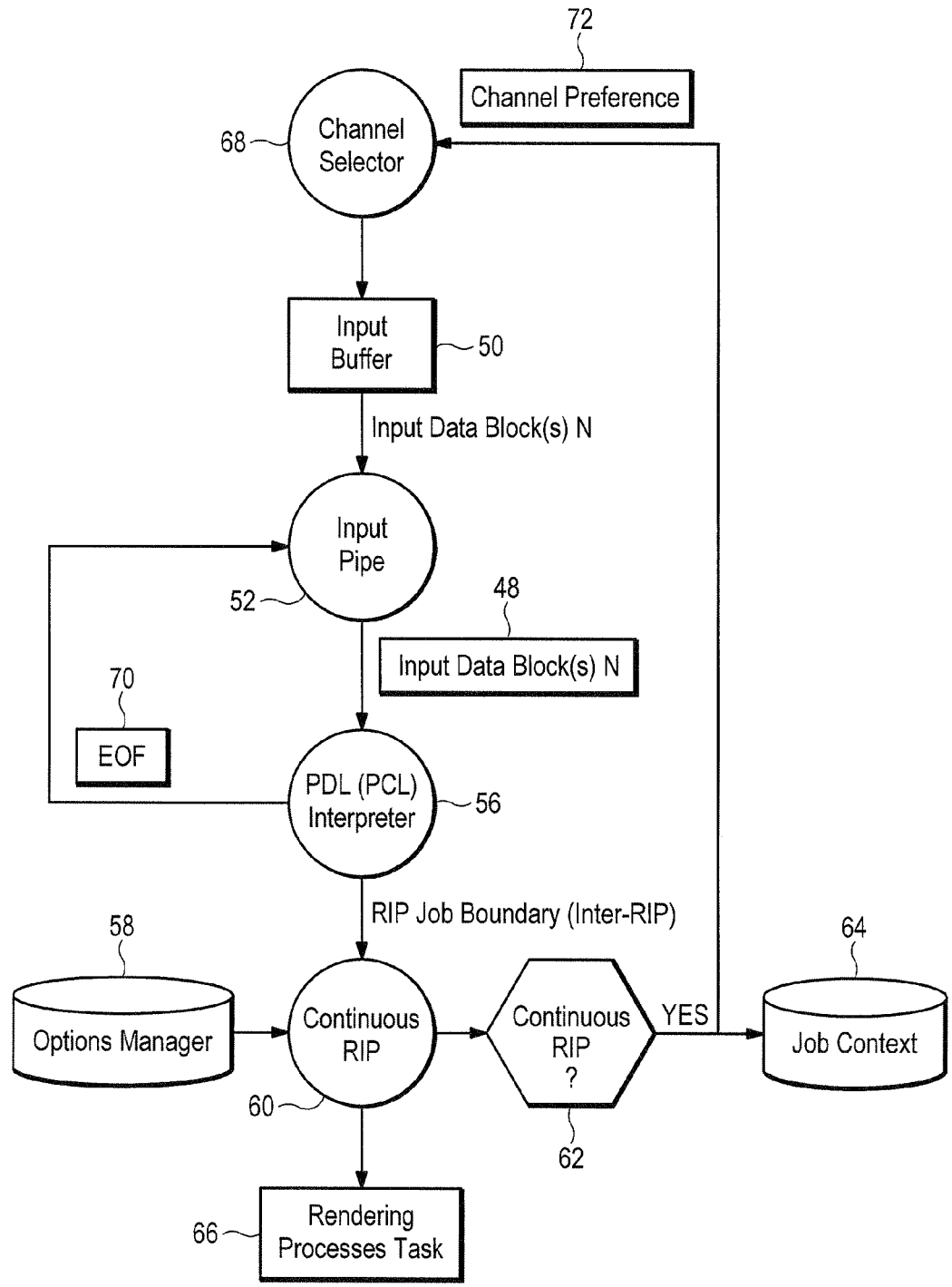
FIG. 3 shows inter-RIP continuous RIP setup between RIPs from consecutive spool files.

FIG. 3 shows how the continuous RIP operation can be performed over multiple different spool files. If the PDL interpreter 56 encounters an EOF 70 (end of spool file) in one of the data blocks 48, the EOF 70 is interpreted as an implicit RIP boundary. If the printing device is in the continuous RIP mode, the continuous RIP operation 60 sends a message 72 back to the input channel selector 68 for a preference to continue to receive print jobs 48 from the same input channel. For example, the same host on the same port that sent the current print job 48. In this embodiment, it may be likely that the print jobs received over the same channel have similar print contexts.

However, in an alternative implementation, the message 72 may indicate some other context to base print job selection other than the channel preference. The channel selector 68 then sniffs the incoming print jobs from the multiple channels and selects the print data candidate from the channel that matches the specified preference 72.

Input Channel Selector Handling of Channel Preference

Figure 4:
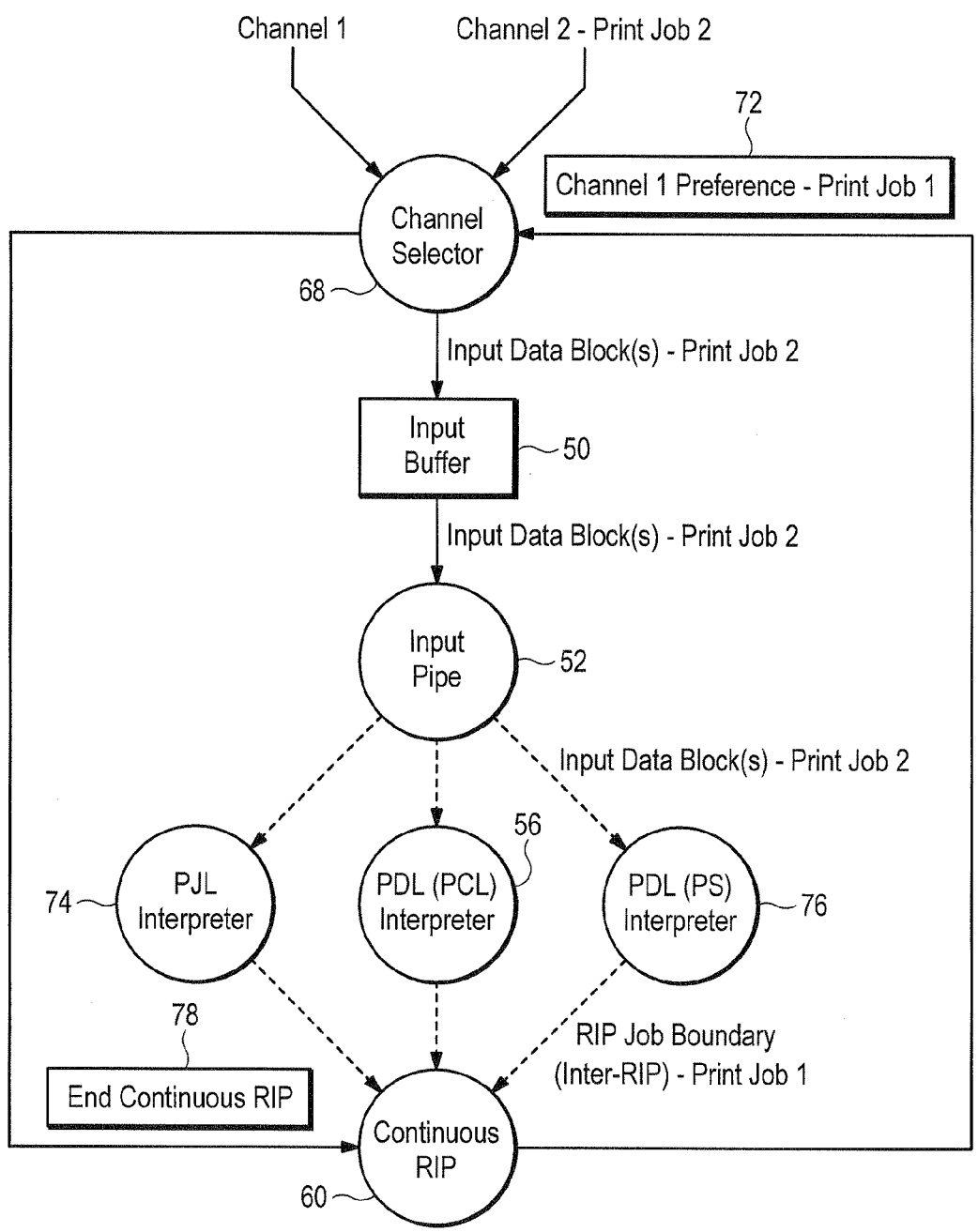
FIG. 4 shows no second print job on a same channel during a continuous RIP mode.
Figure 5:
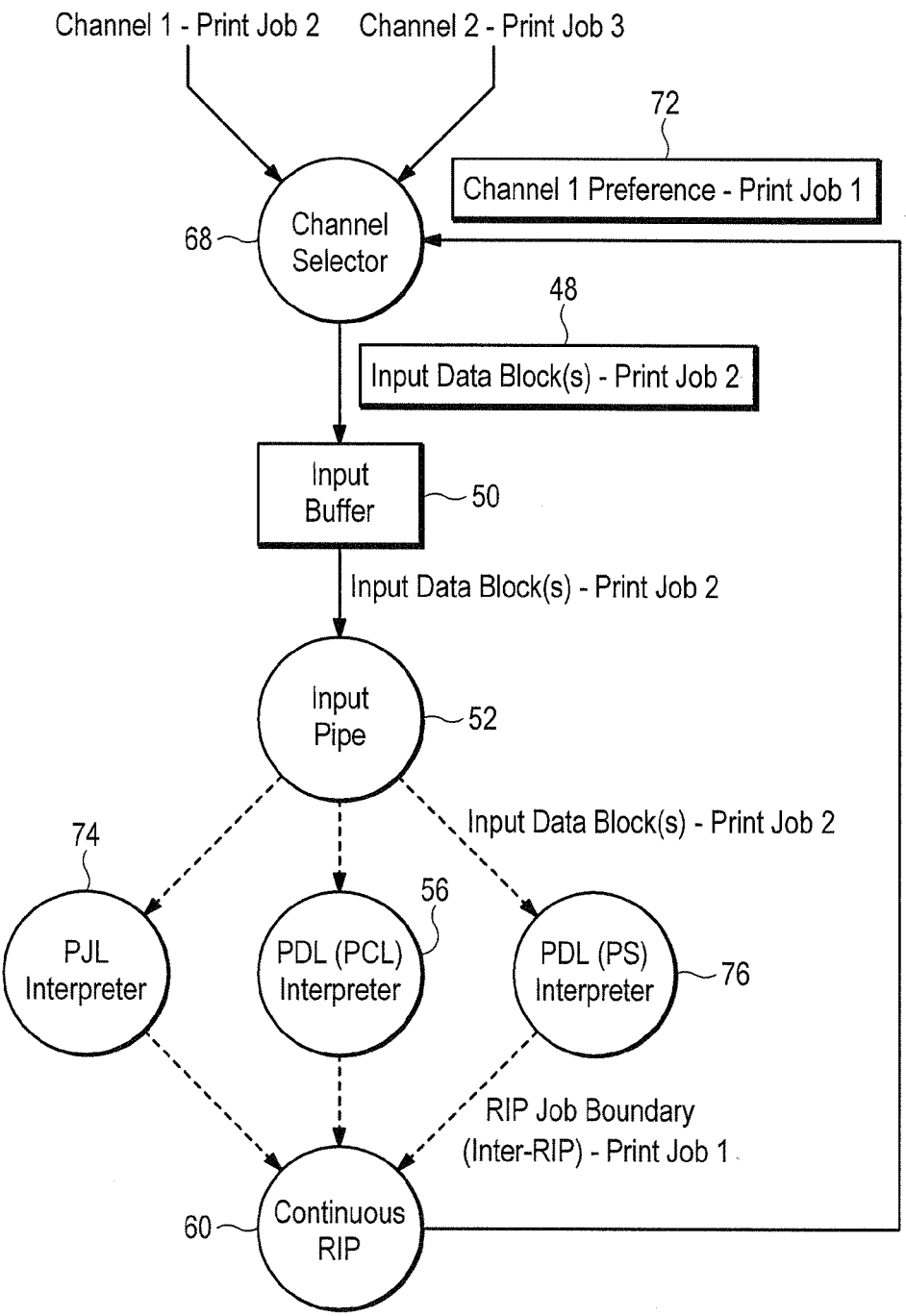
FIG. 5 shows a second print job on a same channel during a continuous RIP mode.

FIG. 4 shows how the channel selector 68 determines what channel to select for processing print jobs according to the continuous RIP operation 60. In FIGS. 4 and 5, the channel selector 68 receives a channel preference 72 from the continuous RIP operation 60. A first print job 1 was previously received on channel 1. The channel preference 72 accordingly gives preference to receiving print jobs on channel 1.

Channel preference may be configured to timeout if a pending job is not detected within some specified period of time on channel 1. If a pending job is not detected on the preferred input channel (e.g., channel 1) within some predetermined period of time, the channel selector 68 sends back an end continuous RIP message 78 to the continuous RIP operation 60. The continuous RIP operation 60 ends the current RIP segment, causing the first print job to be processed as an individual RIP. The channel selector 68 then starts receiving the next available print job, such as print job 2 on channel 2. The next print job 2 is then directed by the input pipe 52 to the interpreter 74, 56, or 76 needed to further processes the print job.

Alternately, the channel preference may be ignored if the number of jobs consecutively selected from the same channel exceeds a threshold and jobs exist on other channels (i.e., to prevent starvation of jobs on other channels).

In FIG. 5, the continuous RIP boundary is detected by the interpreter used for processing print job 1. For example, the RIP job boundary for print job 1 may be identified by a PJL interpreter 74, PDL interpreter 56 or PDL interpreter 76. The first print job 1 was previously received on channel 1.

The continuous RIP operation 60 sends a preference message 72 to the channel selector 68 preferring to receive the next print job from channel 1. A second print job 2 is currently pending on channel 1 and a third print job 3 is currently pending on channel 2. The input channel selector 68 accepts the print job 2 from preferred channel 1 and attempts to conduct a continuous RIP operation for print jobs 1 and 2.

Continuous RIP Handling in PJL Interpreter

Figure 6:
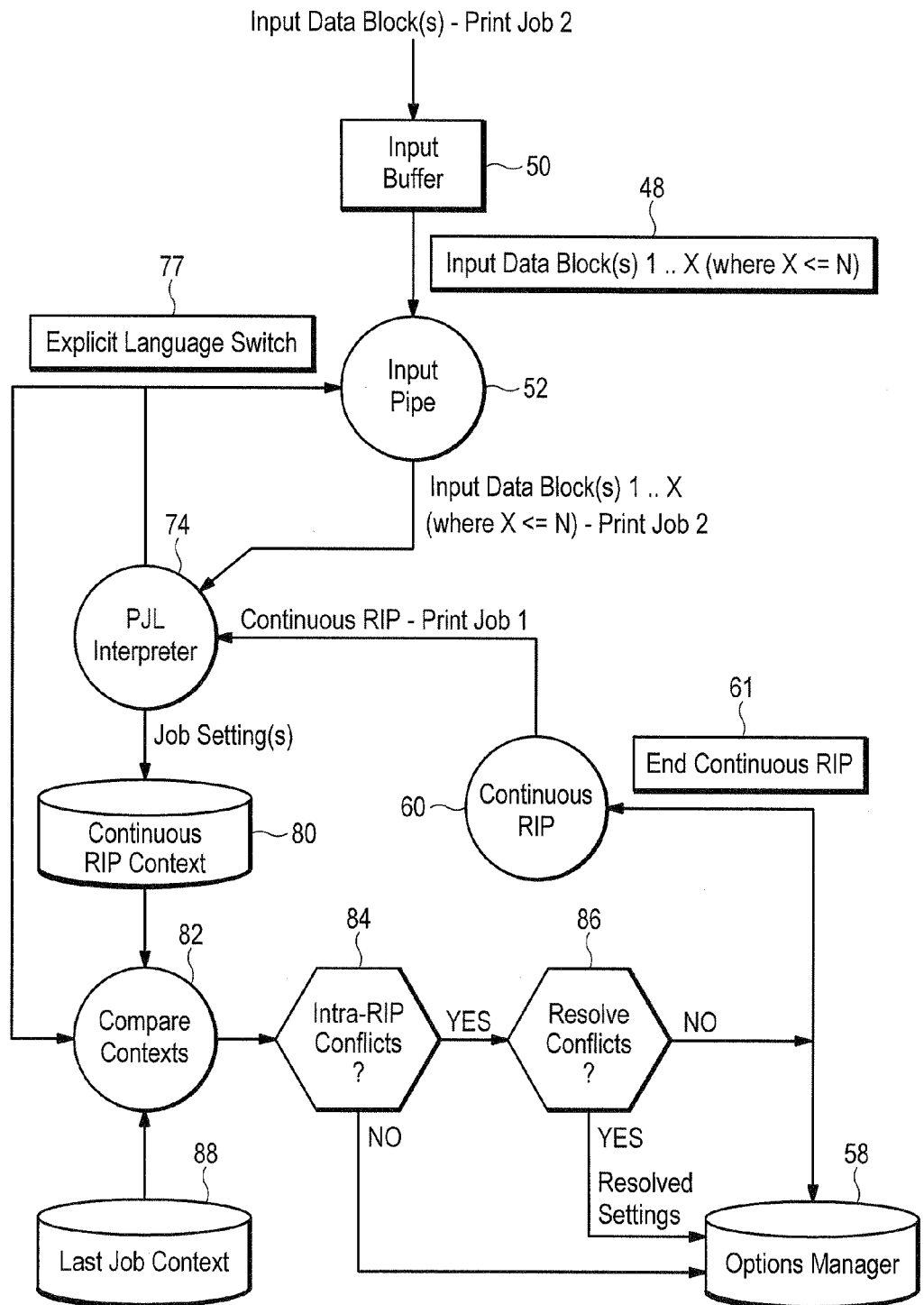
FIG. 6 shows comparing PJL job requirements of a new print job with a last print job for determining intra-RIP conflicts.

In FIG. 6, the PJL interpreter 74, or equivalent job language interpreter, processes the input data blocks 48 from the input pipe 52 that contain the PJL command sequence. For example, the PJL command sequences that are contained in the job control header 47 (FIG. 2A). Each PJL command, recognized as a non-commentary/informational command, is 30 converted to one or more job settings. The PJL interpreter 74 continues until it either reaches the end of the input data 48 or detecting an automatic or explicit language switch 77 (i.e., @PJL ENTER LANGUAGE=<PDL>). The accumulative job settings are stored in a temporary job settings repository referred to here as the continuous RIP context 80.

The continuous RIP context 80 is compared with the job context 88 from the previous RIP job, if any, in comparison operation 82. The comparison operation 82 determines if an inter-RIP conflict would occur if the RIP segments for the current print job 2 and the previously processed print job 1 were fused into a single continuous RIP. Examples of RIP conflicts include:

1. Copy count greater than one.
2. Post-collation operations such as stapling or jogging (job offsetting).
3. Post-Fuser sheet insertion (e.g., front and rear cover insertion).
4. None sequential page ordering (e.g., booklet, N-up, reverse order printing).
5. Change in PDL interpreter (e.g., Postscript vs. PCL). Some examples of print data language changes that do not result in an implicit end of RIP include PJL to a page description language and PCL to HP/GL2

If an inter-RIP conflict is detected in operation 84, operation 86 determines if the conflict can be resolved. Correcting the context conflict in one example involves changing the job settings or modifying the control data for the first or second print jobs. For example, the first and second individual print jobs may both have duplex settings. However, the first print job 1 may end in an odd number of pages. A command is inserted in operation 86 that causes a blank page to be added after the first print job 1.

In another example, first and second individual print jobs may have different print data languages. The print data language for one print job may be converted in operation 86 to the print data language of the other print job, or both print jobs may be converted to a third print data language.

If there are no unresolved inter-RIP conflicts in operation 84, or if there is no previous continuous RIP job, the continuous RIP context 80 is copied over to the job context for the current print job. Otherwise, the compare contexts operation 82 sends a message 61 to the continuous RIP operation 60 to end the continuous RIP of the previous RIP segment. The continuous RIP operation 60 then sends a message to the PJL interpreter 74 to start processing the current RIP segment 48 as an individual RIP segment.

Figure 7A:
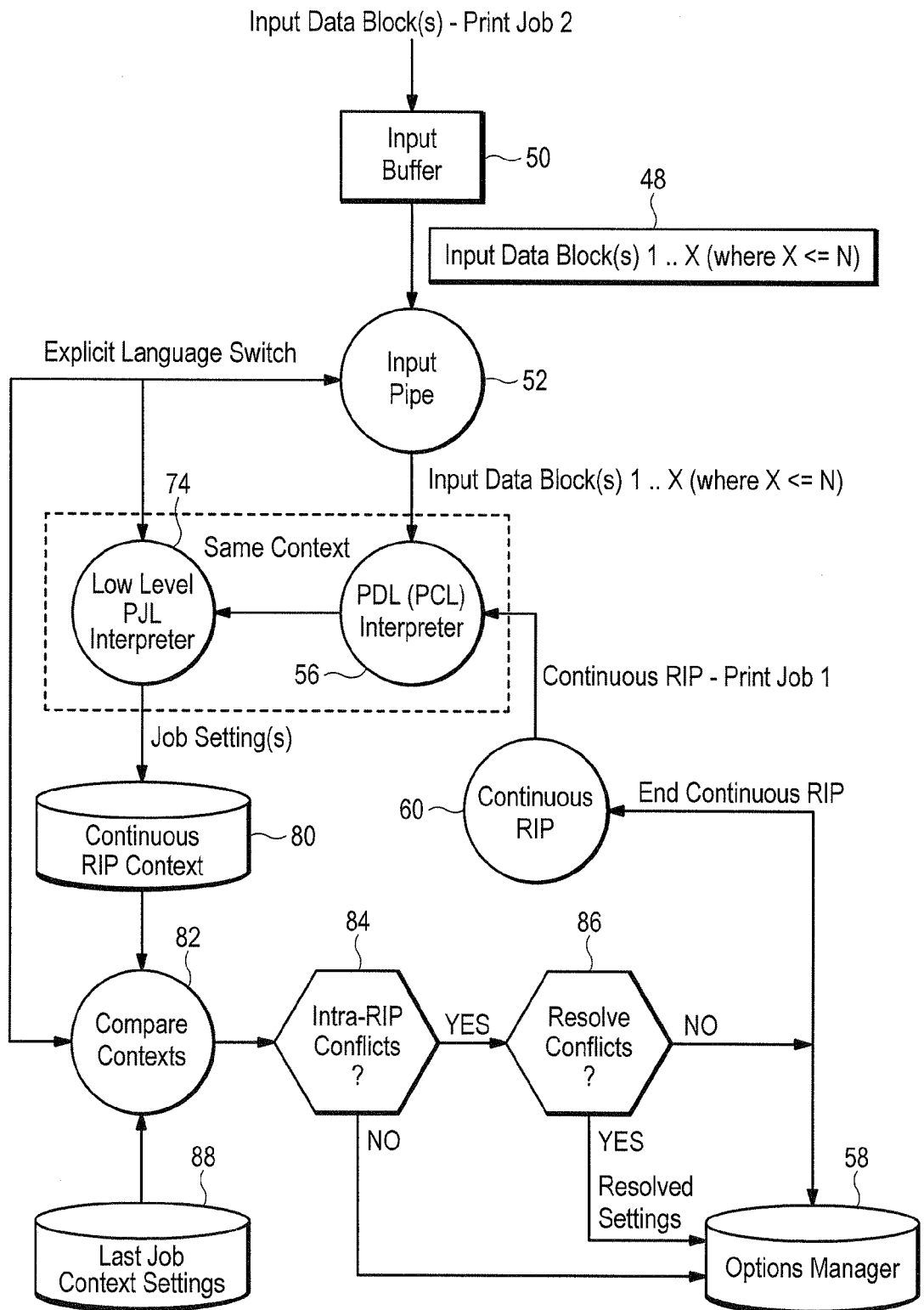
FIG. 7A shows PJL and PDL job requirements of a new print job and a last print job.

FIG. 7A shows the job interpreter process in more detail. The PJL interpreter 74 runs in the same context as the PDL interpreter 56 (e.g., PCL) of the previous RIP segment (Print Job 1). In this embodiment, the sniffer, similar to sniffer 54 in FIG. 2B, attaches the input pipe 52 for the PJL data to the existing PDL interpreter context. The PDL interpreter 56 then initiates the PJL interpreter 74 passing the PJL data to the PJL interpreter 74.

Figure 7B:
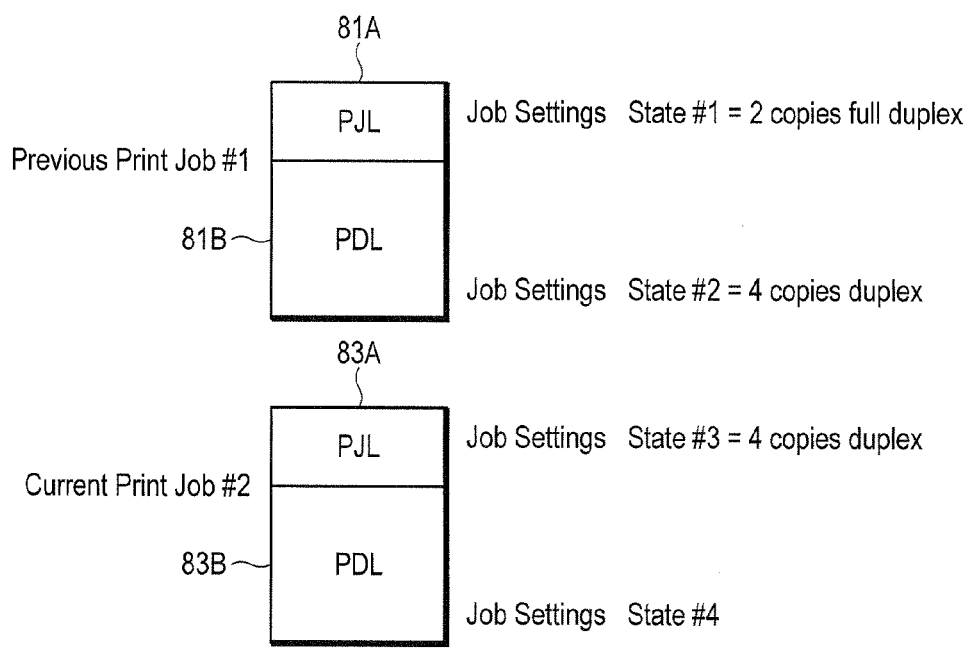
FIG. 7B shows how job settings are derived for different PJL and PDL sections of different print jobs.

FIG. 7B shows a previous processed print job 1 and a currently processing print job 2. The PJL interpreter 74 identifies job setting state 1 from the PJL data 81A in print job 1. For example, the PJL interpreter 74 may identify job settings for 2 copies and a full duplex mode for the print job 1 from the PJL data 81A. The PDL interpreter 56 in FIG. 7A is then used to identify additional or different job settings in the PDL data 81B that form a second job setting state 2. For example, the PDL data 81B may indicate printing 4 copies and full duplex mode for the print job 1.

As the second print job 2 is processed, the continuous RIP operation 60 in FIG. 7A stores the job settings state 2 from the previous print job 1. For example, 4 copies and full duplex mode. The continuous RIP operation 60 may kick off a low level PJL interpreter operation for the PJL data 83A in the second print job 2. For example, the PJL interpreter 74 (FIG. 7A) may only read enough of the PJL data 83A necessary to verify that the job settings in PJL 83A are compatible with the job settings state 2 for the previous print job 1.

In this implementation, the sniffer 54 in FIG. 2B may attach the input pipe 52 (FIG. 7A) for the PJL data to the existing PDL interpreter context 56. The PDL interpreter 56 then initiates a low level PJL interpreter 74 passing the PJL data 83A to the PJL interpreter 74. If the PJL data 83A is compatible with job settings state 2, the PDL interpreter 56 starts processing the PDL data 83B in the current print job 2. The PDL interpreter 56 identifies any additional job settings in the PDL data 83B. Additional job settings in PDL data 83B compatible with the existing job settings in state 3 are added to form job settings state 4.

If the PJL interpreter 74 or the PDL interpreter 56 identifies job settings that are in conflict with job settings state 2 from print job 1, and the conflicting job settings in print job 2 cannot be resolved, the input pipe 52 may start a new RIP job and send the PJL data 83A to the PJL interpreter 74 for complete processing of the PJL data 83A generating the new job settings for print job 2. The PDL interpreter 56 then identifies any additional job settings from the PDL data 83A.

Continuous RIP Handling in PDL Interpreter

Figure 8:
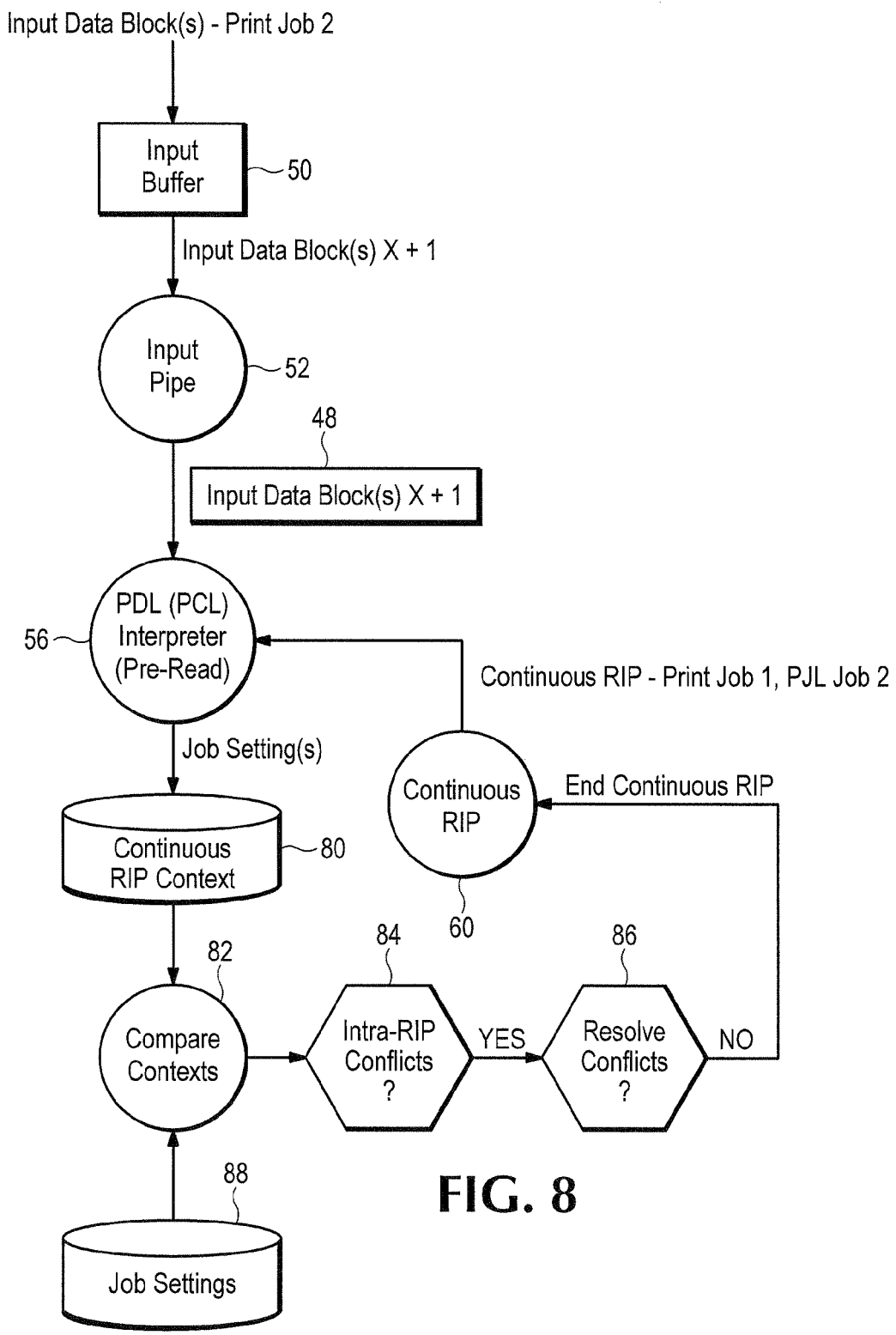
FIG. 8 shows a pre-read and compare of PDL job requirements for a new print job with a last print job for identifying intra-RIP conflicts.

FIG. 7A showed how inter RIP conflicts were handled between a previous print job 30 and the job context from PJL data for a second print job. FIG. 8 shows how inter RIP conflicts were handled between a previous print job and job context from PDL data. In FIG. 8, an explicit or automatic language switch is indicated to the PDL interpreter 56. The PDL interpreter 56 does a pre-read of some initial portion of the input data stream 48. This initial portion may include any job-wide settings that proceed an initial first page preamble. The PDL interpreter 56 stores any job-wide or other RIP related settings into the temporary job settings repository 88. The PDL interpreter 56 then invokes the continuous RIP process 60 that performs the inter-RIP conflict analysis 84 described earlier.

If there are no unresolved intra-RIP conflicts, the PDL interpreter 56 restarts the reading of the input data stream 48 and continues to process the RIP segment as a continuous print job. Otherwise, the continuous RIP operation 60 resets the job context from the temporary job settings 88 stored by the PJL interpreter 56. The continuous RIP operation 60 then ends the RIP for the previous RIP segment, restarts reading of the input data stream 48 and processes the current job as an individual RIP.

Display List Handling and Rendering Process Task

Figure 9:
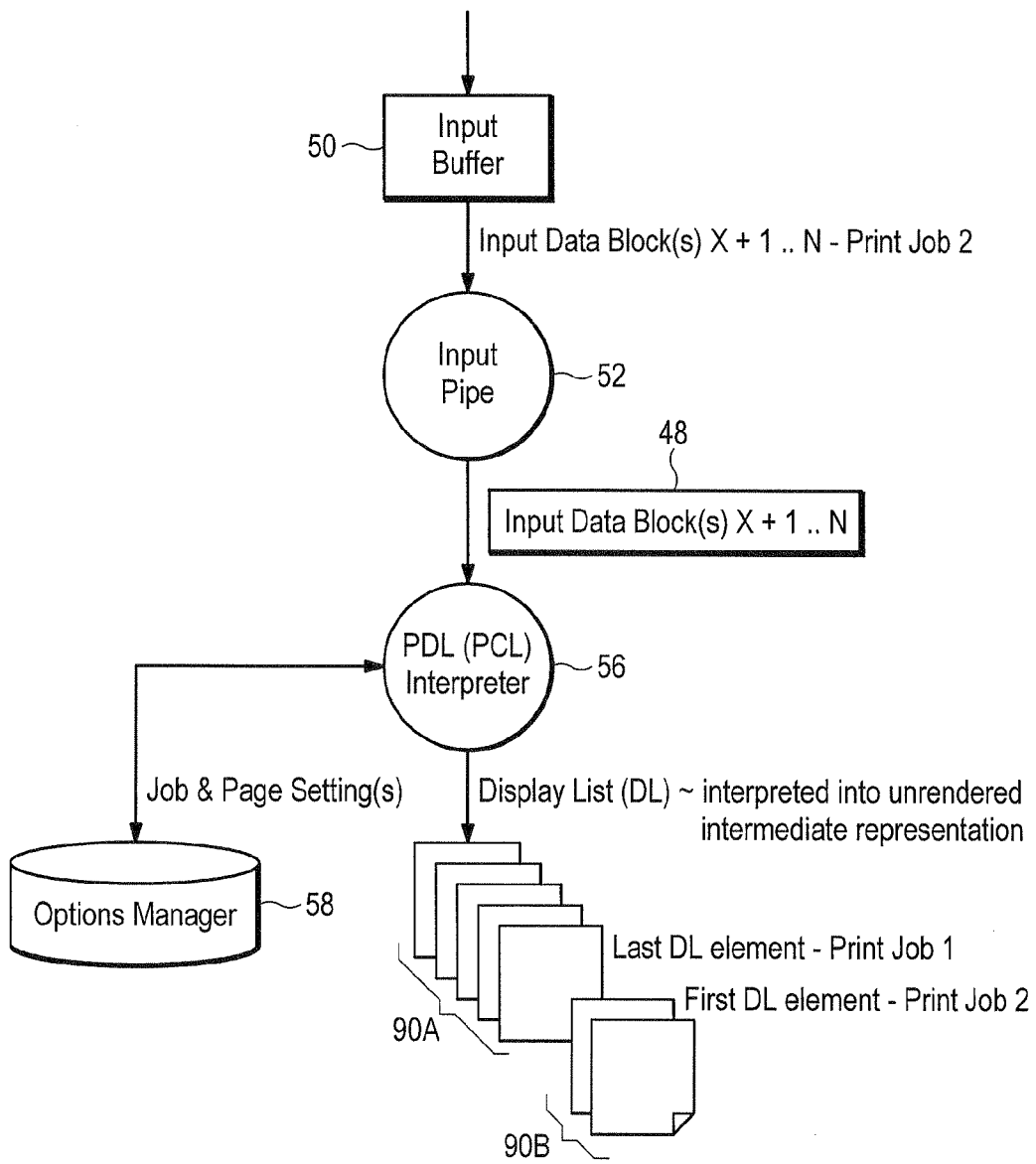
FIG. 9 shows how a display list for a second print job is appended to a first print job.
Figure 10:
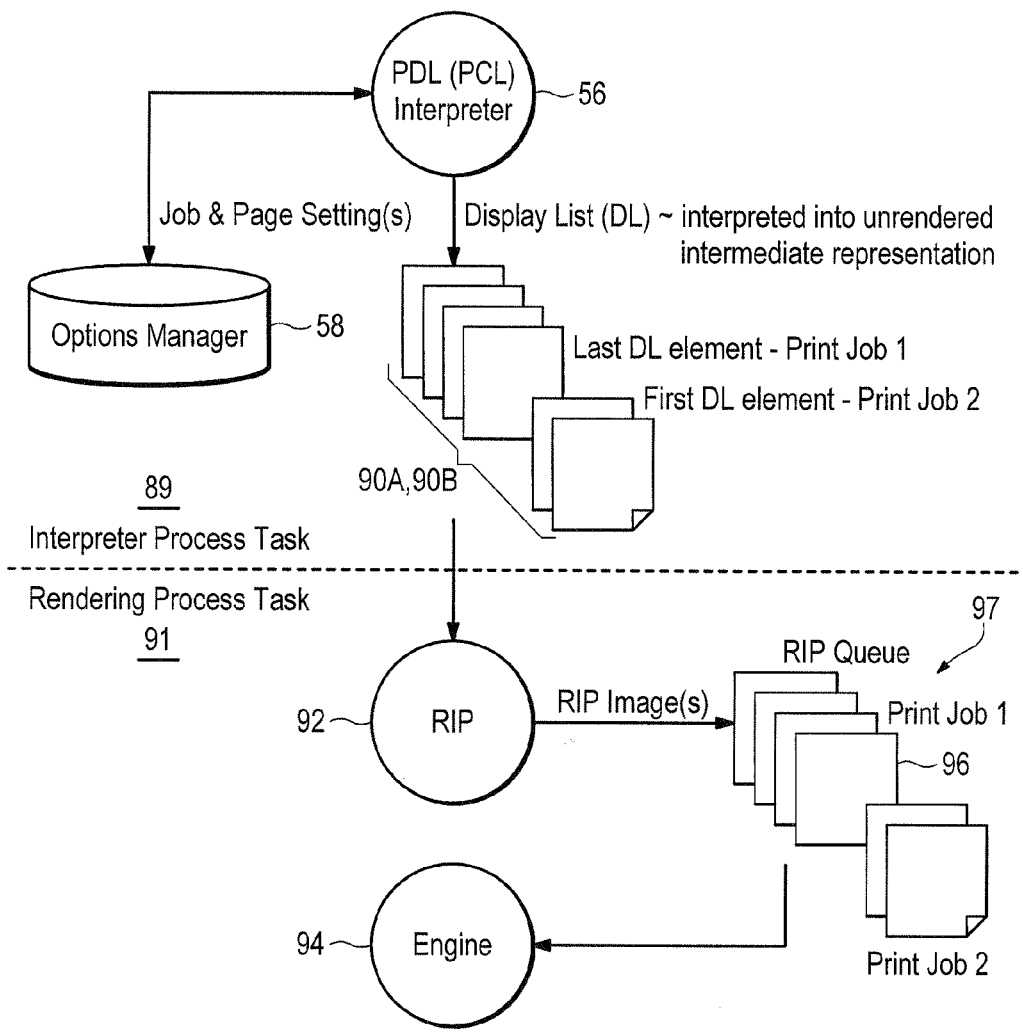
FIG. 10 shows continuous RIP across print jobs.

FIG. 9 shows further how the PDL interpreter 56 processes multiple RIP segments as a continuous RIP. The PDL interpreter 56 appends display list (DL) elements 90B generated from a current RIP segment of the input data 48 onto the end of the DL elements 90A generated from the previous RIP segment of the input data 48. The joined DL segments 90A and 90B appear to be a single RIP to a rendering process task 91 (FIG. 10). The display list 90A and 90B is sent in a common unrendered intermediate print format generated from the PJL, PDL, PS and any other print data formats used for the print jobs.

FIG. 10 shows how a rendering process task 91 processes the joined DL display list 90A, 90B as a single RIP, where each collection of DL elements that form a page image are rasterized into a raster page 96. Each raster 96 page is placed in a RIP queue 97 for a single marking job. A marking engine 94 retrieves the RIP page images 96 from the RIP queue 97 for final marking/outputting.

Job Join Fusion in Input Channel Selector

Figure 11:
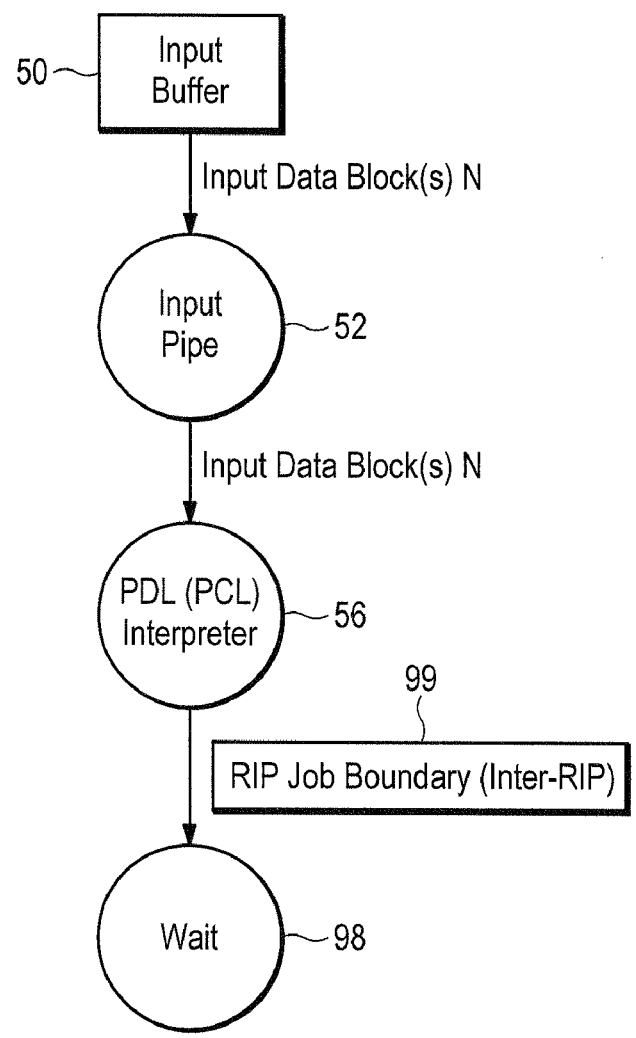
FIG. 11 shows a PDL interpreter waiting on an inter-RIP boundary for a message from a channel selector.

FIG. 11 shows an implementation where the decision to conduct a continuous RIP is done upstream from the PDL interpreter 56. For example, the continuous RIP decision can be performed at the channel selector 68 (FIG. 12) or input pipe 52. In this configuration, the PDL interpreter 56 after reaching a RIP boundary 99 goes into a wait state 98 waiting for a message from the input channel selector 68 or input pipe 52 indicating whether or not to conduct a continuous RIP with a next RIP segment. While the PDL interpreter 56 is in the wait state 98, the ending RIP boundary command 99 is not processed.

Figure 12:
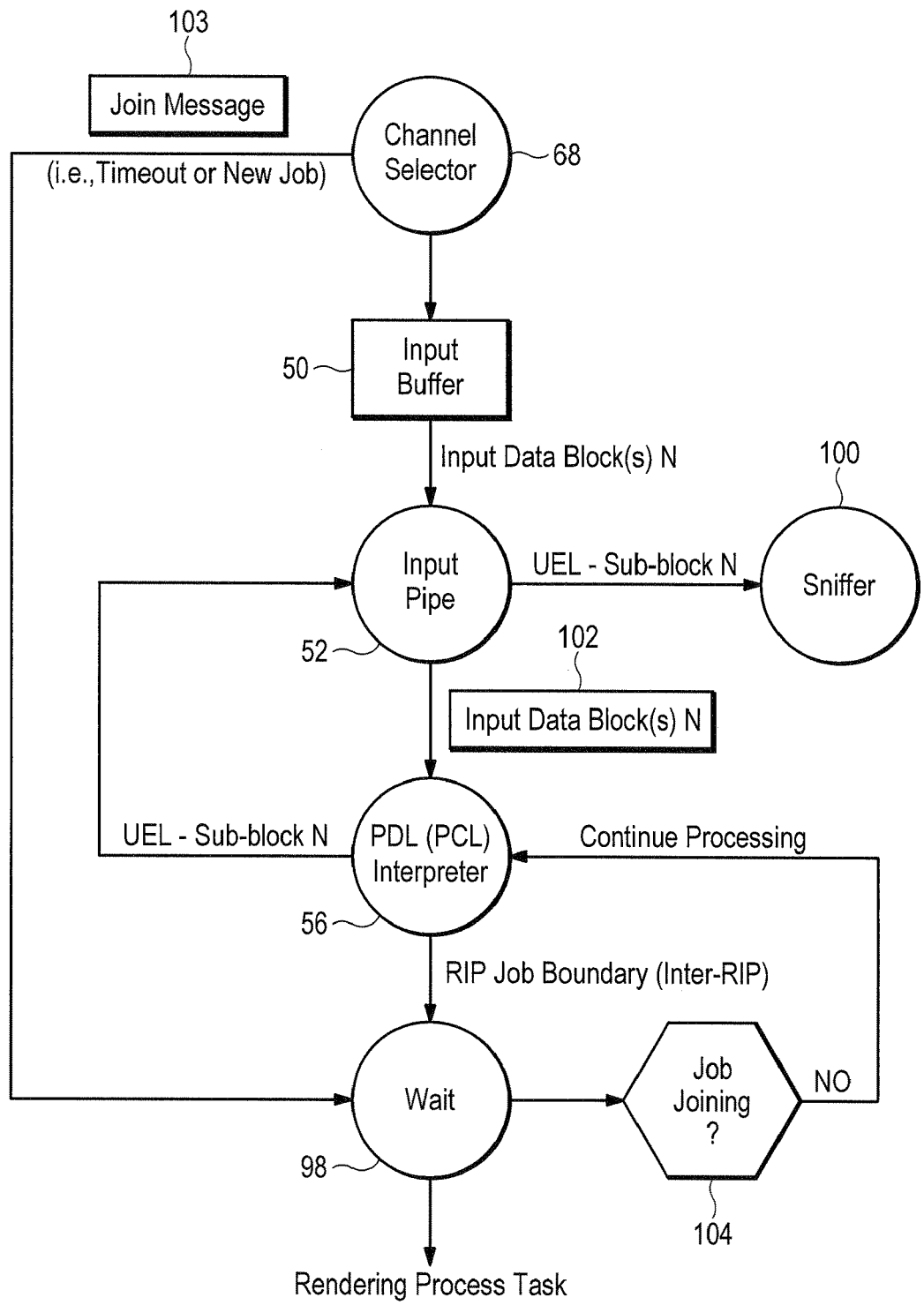
FIG. 12 shows a channel selector sending a no join message to a PDL interpreter wait process.

FIG. 12 shows the upstream control of RIP segments as shown in FIG. 11 in more detail. The input channel selector 68 sends a job join message 103 back to the PDL interpreter while in the wait state 98. Message 103 is sent either when a new print job arrives or when a timeout occurs while waiting for a new print job. If a timeout occurs or a new print job is received on a different channel, the channel selector 68 sends a message 103 telling the PDL interpreter 56 that any new print jobs are not going to be joined with the preceding RIP segment. The PDL interpreter 56 resumes processing the current RIP segment 102 as an individual RIP.

Figure 13:
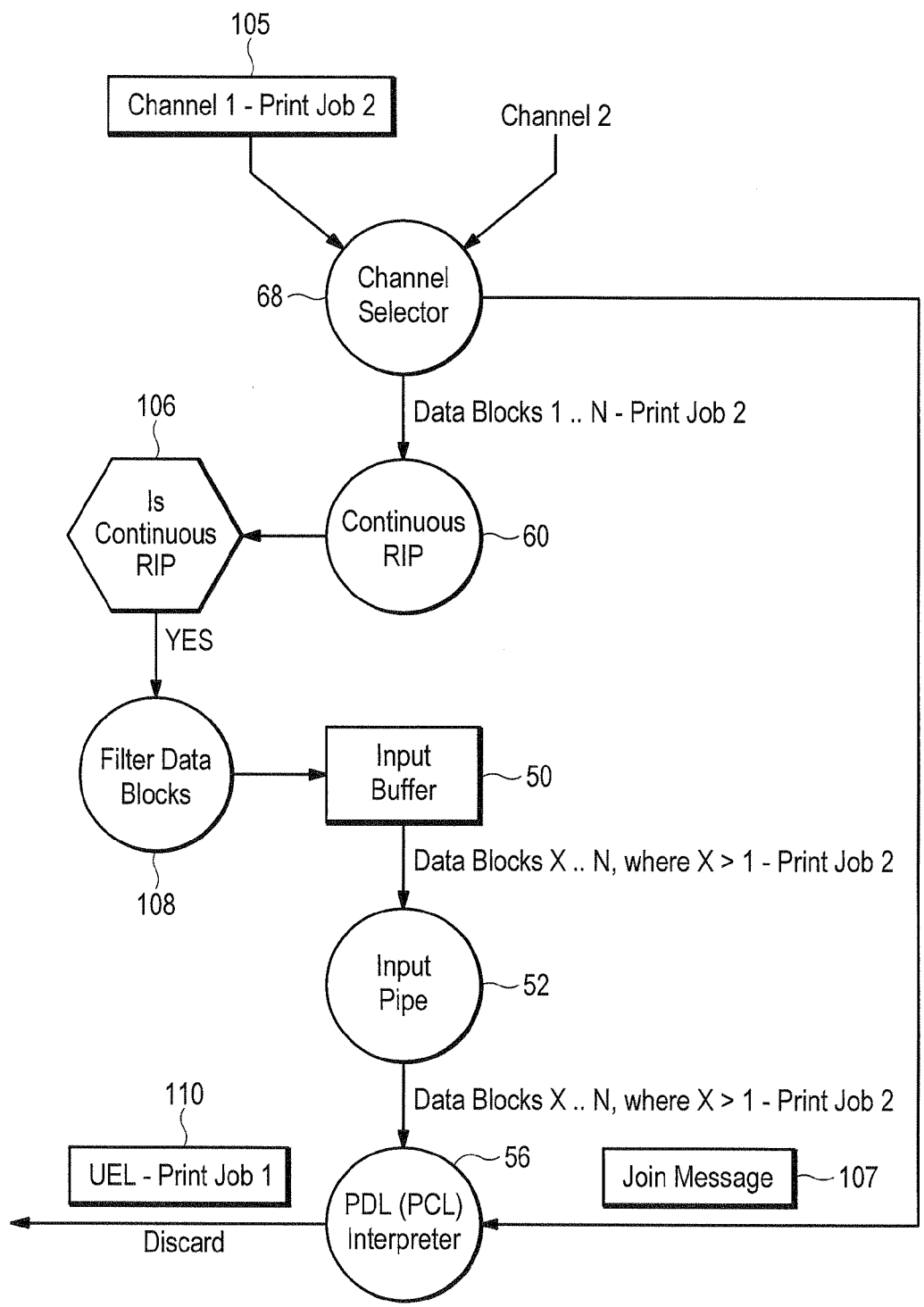
FIG. 13 shows how a channel selector fuses data streams from two print jobs together as a single print job and sends the fused print jobs to a PDL interpreter.

FIG. 13 shows how the continuous RIP process described above is invoked by the input channel selector 68. A new print job 105 is determined to be a candidate for job joining. For example, the new print job 2 arrives within a specified time period on the same channel 1 receiving a previous print job 1. The continuous RIP operation 60 determines if the new print job 2 qualifies for continuous RIP in operation 106.

The continuous RIP mode 60 may be initiated by an operator setting, or a command within the print jobs. If the new print job 105 is a candidate for continuous RIP, the continuous RIP operation 60 does a pre-read of an initial portion of the input data stream. The pre-read generally includes reading the PJL commands, or other job/spooling control header data, and the PDL data up to the first page preamble. In this case, the pre-read function has the capability to parse the print data language streams of both the PJL, or other job/spooling control header data and PDL, and recognize job-wide or other related RIP settings.

The pre-read function stores the job-wide or other RIP related settings in a temporary job settings repository and performs the inter-RIP comparison function as described earlier. If the new print job does not have any unresolved inter-RIP conflicts, the temporary job settings are copied into the current job settings, and the PJL header and other beginning RIP boundary commands are discarded (filtered) in operation 108 from the input data stream and not passed to the input pipe 52.

The continuous RIP operation 60 sends a job join message 107 to the PDL interpreter 56. The PDL interpreter 56 upon receipt of the job join message 107 resumes processing by discarding the ending RIP boundary command sequence 110 for the previous job 1. For example, the PDL interpreter 56 may discard any UEL and PJL end spooling commands. The two print jobs 1 and 2 are then processed as a continuous RIP.

Job Join Fusion and Control Occurs in Input Channel Selector

Figure 14:
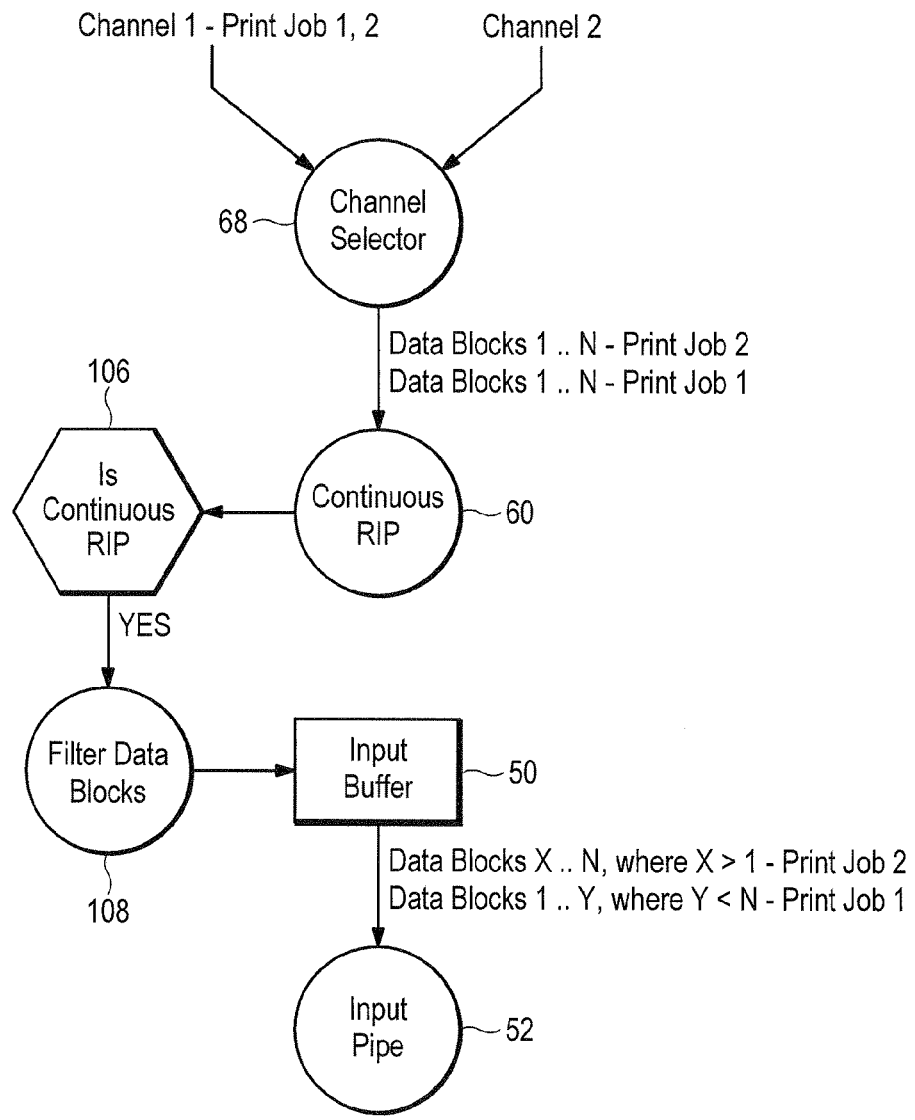
FIG. 14 shows job streaming fusion and control in a channel selector.

In FIG. 14, the control and discarding of RIP boundary command sequences occur in the input channel selector 68. In this case, the input channel selector 68 invokes the continuous RIP process for each received candidate print job. The continuous RIP operation 60 pre-reads each input data block.

If the current print job 1 is the first job in a possible job join operation, the pre-read operation passes through all the input data to the input pipe 52 until it detects the ending RIP boundary command sequence. The pre-read process than suspends passing the remaining data, such as the UEL for print job 1 until data arrives for the next print job 2 or a timeout is reached. If the next print job 2 is not on the same channel or a timeout is reached, the pre-read process resumes and passes the ending RIP boundary sequence to the input pipe 52.

Otherwise, the pre-read function performs the analysis process as described above on some initial portion of the input data stream for the second print job 2. If the continuous RIP operation 60 determines that the two print jobs 1 and 2 can be joined, the temporary job settings are copied into the current job settings, and the PJL header and other beginning RIP boundary commands are discarded from the input data stream in operation 108 and not passed to the input pipe 52.

Figure 15:
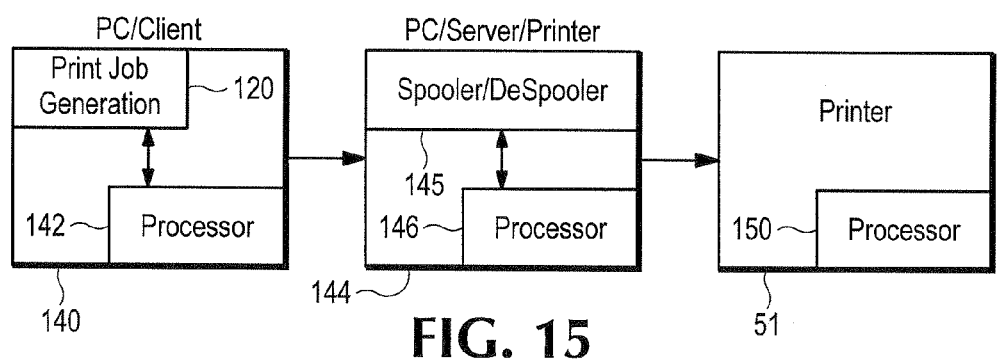
FIG. 15 shows a printing system that incorporates the continuous RIP operations described in FIGS. 2A-14.

FIG. 15 shows an example of a printing system that implements the printing operations described above. A print job generation process 120 is generally performed in a Personal Computer (PC) or other computing device alternatively referred to as a client or host 140. The client 140 has a processor 142 that runs application software and a printer driver 120 that generates the print job.

The print job is then generally sent to a spooler/despooler operation 145 that in one embodiment is software that runs on a processor 146. The spooler/despooler operation 145 can be conducted in the client 140, in a separate server 144, or in the printer device 51. In other printer systems the spooler/despooler operation 145 may be distributed among multiple different connected computing devices. A spooler function manages the print jobs by creating a print job queue and then deciding when to hand off the print jobs to one or more printers 51. A despooling function then delivers the print jobs and confirms that the print jobs are successfully printed.

The printer device 51 has a processor or controller 150 that can conduct some or all of the continuous RIP operations described above in FIGS. 2-14. In an alternative embodiment, other portions of the continuous RIP operation are implemented in software that is run by different combinations of the processors in devices 140, 144 and 51. For example, the spooler 145 my perform any of the channel selector operations 68 described above while the other input pipe 52 and interpreter operations may be performed in the printing device 51. In yet other embodiments, different portions of the continuous RIP operation are run in different combinations of the client 120, server 145 and printer 148 according to the resource availability, and possibly other factors.

Those skilled in the art understand language formats for print jobs and therefore these details are not described in further detail. This information is described in the following publications: HP PCL/PJL Reference, Printer Job Language Technical Reference, 11$^{th}$ Edition (1999), HP PCL Printer Language Technical Reference Manual, 1$^{st}$ Edition (1992); Adobe Postscript Language Reference Manual, 3$^{rd}$ Edition which are herein incorporated by reference.

PJL/PDL interpreters, display list generation, rendering and inter-RIP processing between print jobs are described in Integrated Printing Subsystem (IPS) 5.02, Zoran Technology which is herein incorporated by reference. Input channel selectors used for an MFP device are described in Sharp RF-SoftNIC which is also herein incorporated by reference.

OTHER EMBODIMENTS

Other embodiments include other imaging operations which are de-spooled continuously to or from the same imaging device, such as fax, scan, network copy, and document/image management, such as document archive/retrieval, manipulation and transfer.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for processing print jobs, comprising:
during a rasterization process, receiving unrasterized print input data to be processed for printing;
identifying a first job context for a first Raster Image Processing (RIP) segment wherein the first RIP segment comprises an RIP boundary indicator;
identifying a second job context for a second RIP segment following the first RIP segment wherein a job context characterizes print job operational constraints corresponding to printing equipment or print processing units that reset or delay between RIP segments;
determining whether the second job context is compatible with the first job context;
if the second job context is compatible with the first job context then combining the first and the second RIP segments together and processing the combined RIP segments as a continuous RIP job to output a single print job without resetting compatible job context parameters to minimize printing delay;
giving channel preferences to a next print job received on a same input channel as a previously received print job comprising the first RIP segment;
reaching the RIP boundary on the first RIP segment of a current print job;
sending a channel preference message to a channel selector indicating a preference to receive a next job from the same channel used for receiving the first RIP segment;
performing a continuous RIP for the first RIP segment and the second RIP segment if the second RIP segment is received on the same channel as the first RIP segment within a predetermined period of time after reaching the RIP boundary on the first RIP segment; and
processing the first RIP segment as an individual RIP when the second RIP segment is not received over the same channel as the first RIP segment within the predetermined period of time.

2. The method according to claim 1 including:
processing the first RIP segment as an individual RIP job if the second job context is not compatible with the first job context.

3. The method according to claim 1, wherein the RIP boundary indicator comprises Universal Exit Language (UEL) or End Of File (EOF) data.

4. The method according to claim 1 including the channel selector responding to the channel preference message with a message to end continuous RIP when no RIP segments are received over the channel receiving the first RIP segment within the predetermined period of time or when a predetermined number of print jobs are received over channels other than the channel receiving the first RIP segment.

5. The method according to claim 1 wherein:
said determining whether the second job context is compatible with the first job context includes:
identifying conflicts between the first job context and the second job context;
terminating an RIP operation after completion of the first RIP segment when the identified conflicts cannot be resolved; and
conducting a continuous RIP operation including both the first and second RIP segments when the identified conflicts are resolvable.

6. The method according to claim 5 including resolving a duplex/non-duplex mode job context conflict by inserting an additional piece of paper between the first and second RIP segments.

7. The method according to claim 1 including:
interpreting Printer Job Language (PJL) data for a first RIP segment to identify current job settings;
interpreting Page Description Language (PDL) data for the first RIP segment for adding to or modifying the current job settings;
interpreting just enough PJL data in a second RIP segment to verify that job settings for the second RIP segment are compatible with the current job settings;
interpreting PDL data in the second RIP segment for adding to or modifying the current job settings; and
using the current job settings for conducting a continuous RIP for the first and second RIP segments.

8. A method for rasterizing print data, comprising:
receiving unrasterized print job input data corresponding to one or more print jobs, wherein the input data contains one or more Raster Image Processing (RIP) segment boundary indicators separating two or more RIP segments;
comparing job settings for the two or more RIP segments to determine if there are unresolvable inter-RIP job setting conflicts among the two or more RIP segments;
wherein the job settings characterize print job operational constraints corresponding to printing equipment or print processing units that reset or delay between RIP segments;
responsive to the comparing job settings, if there are no unresolvable inter-RIP job setting conflicts, then rasterizing the at least two RIP segments as a continuous RIP job comprising new RIP job boundaries, wherein rasterizing the at least two RIP segments proceeds independent of forwarding the RIP segment boundary indicators to an associated printer or print engine so that the associated printer or print engine does not reset print job settings between the RIP segments;
making a decision for joining the print jobs for continuous rasterizing in a channel selector upstream of print job language interpreters;
suspending processing of Universal Exit Language (UEL) or End Of File (EOF) data;
preserving current job settings for a current print job when a Page Description Language (PDL) interpreter encounters a RIP boundary;
conducting a pre-read of a next print job in the print job channel selector; in the channel selector, determining whether or not the next print job can be joined as a continuous RIP with the current print job, based on the pre-read of an initial portion of the next print job;
completing processing of the current print job as an individual RIP if the channel selector determines that the next print job cannot be joined as a continuous RIP with the current print job;
if the channel selector determined that the next print job can be joined as a continuous RIP with the current print job, discarding any ending RIP boundary commands from the current print job; and
discarding any beginning RIP boundary commands encountered in the next print job and processing the current print job and the next print job as a continuous RIP.

9. The method according to claim 8 including joining the print jobs for continuous RIP operations downstream of print job language interpreters.

10. The method according to claim 8 including:
interpreting current job settings in Printer Job Language (PJL) data for a current print job;
comparing the current job settings with previous job settings for a previous print job;
ending the previous print job, replacing the previous job settings with the current job settings, continuing to rasterize the current print job data as an individual RIP if the current job settings conflict with the previous job settings; and
rasterizing the current print job data as a continuation of the previous print job if there are no inter-RIP conflicts between the current job settings and the previous job settings.

11. The method according to claim 8 including:
performing a pre-read of some initial portion of Page Description Language (PDL) data in a current print job to identify any current job-wide settings;
comparing the current job-wide settings with previous job settings;
ending a previous print job and continuing the current print job as an individual RIP when there are unresolved inter-RIP conflicts between the current job-wide settings and the previous job settings; and
re-reading the PDL data and continuing the current print job as a continuation of the previous print job when there are no unresolved inter-RIP conflicts between the current job-wide settings and the previous job settings.

12. The method according to claim 8 including pre-reading the print jobs and making continuous RIP decisions during a channel selection stage of processing the incoming print data.

13. The method according to claim 12 including:
using the channel selection stage to discard ending RIP boundary commands from a first print job and discard beginning RIP boundary commands from a second print job when the first and second print jobs can be processed as a continuous RIP;
combining the first and second print jobs together; and
sending the combined first and second print jobs to a print job language interpreter.

14. A printing system, comprising:
a processor for executing machine-readable instructions embedded in a tangible medium, the instructions for:
identifying Raster Image Processing (RIP) boundaries during a rasterization process in print data;
determining if there are RIP processing conflicts between different portions of the print data separated by the RIP boundaries; and processing the different portions of print data with no RIP processing conflicts or resolvable RIP conflicts as a continuous RIP by changing the RIP boundaries;

a channel selector selecting different input channels for receiving different print jobs;

wherein the channel selector identifies RIP processing conflicts between the different portions of the print data and the processor processes the different portions of the print data without RIP processing conflicts as continuous RIPs;

wherein the channel selector is located in a server for receiving unrasterized print input data to be processed for printing during a rasterization process and the processor is located in a printer device.

15. The printing system according to claim 14 wherein the processor is for executing further instructions for: identifying the RIP processing conflicts by comparing job settings or page settings associated with the different portions of print data.

16. The printing system according to claim 15 wherein the processor is for executing further instructions for: identifying the job settings or page settings from Printer Job Language (PJL) data and Page Description Language (PDL) data associated with the different portions of print data.

17. The printing system according to claim 14 wherein the processor is for executing further instructions for: selecting a new print job from a same input channel receiving a currently processing print job to reduce inter-RIP conflicts between print jobs.

18. The printing system according to clam 17 wherein the processor is for executing further instructions for: terminating a continuous RIP when there are no new print jobs received on the same input channel within a specified time period or when a number of consecutive print jobs processed from the same channel exceeds a threshold.

19. The printing system according to claim 14 wherein the processor is for executing further instructions for: filtering RIP boundary identifiers from the portions of print data that are processed as continuous RIPs.

* * * * *